United States Patent
Chen et al.

(10) Patent No.: US 10,097,820 B2
(45) Date of Patent: Oct. 9, 2018

(54) FRAME-COMPATIBLE FULL-RESOLUTION STEREOSCOPIC 3D VIDEO DELIVERY WITH SYMMETRIC PICTURE RESOLUTION AND QUALITY

(71) Applicant: Dolby Laboratories Licensing Corporation, San Francisco, CA (US)

(72) Inventors: Tao Chen, Palo Alto, CA (US); Hariharan Ganapathy, I, Santa Clara, CA (US); Samir N. Hulyalkar, Santa Clara, CA (US); Gopi Lakshminarayanan, Fremont, CA (US); Peng Yin, Ithaca, NY (US); Taoran Lu, Santa Clara, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 561 days.

(21) Appl. No.: 14/348,263

(22) PCT Filed: Sep. 27, 2012

(86) PCT No.: PCT/US2012/057610
§ 371 (c)(1),
(2) Date: Mar. 28, 2014

(87) PCT Pub. No.: WO2013/049383
PCT Pub. Date: Apr. 4, 2013

(65) Prior Publication Data
US 2014/0286397 A1  Sep. 25, 2014

Related U.S. Application Data

(60) Provisional application No. 61/541,005, filed on Sep. 29, 2011, provisional application No. 61/583,081, filed on Jan. 4, 2012.

(51) Int. Cl.
*H04N 13/00* (2018.01)
*H04N 19/119* (2014.01)
(Continued)

(52) U.S. Cl.
CPC ... *H04N 19/00072* (2013.01); *H04N 13/0007* (2013.01); *H04N 13/0048* (2013.01);
(Continued)

(58) Field of Classification Search
CPC .......... H04N 19/00072; H04N 19/119; H04N 19/597; H04N 13/0007; H04N 13/0048; H04N 13/0059
See application file for complete search history.

(56) References Cited

U.S. PATENT DOCUMENTS

| 5,404,167 A * | 4/1995 | Bist ........................ H04N 19/63 375/240.11 |
| 5,416,510 A | 5/1995 | Lipton |

(Continued)

FOREIGN PATENT DOCUMENTS

| CN | 101444102 | 5/2009 |
| CN | 101795418 | 8/2010 |

(Continued)

OTHER PUBLICATIONS

ITU-T and ISO/IEC JTC 1, "Advanced Video Coding for Generic Audiovisual Services" ITU-T Recommendation H.264 and ISO/IEC 14496-10, 2009.
(Continued)

*Primary Examiner* — Sath V Perungavoor
*Assistant Examiner* — Philip Dang

(57) ABSTRACT

A high resolution 3D image may be encoded into a first multiplexed image frame and a second multiplexed image frame in a base layer (BL) video signal and an enhancement layer (EL) video signal. The first multiplexed image frame
(Continued)

may comprise horizontal high resolution image data for both eyes, while the second multiplexed image frame may comprise vertical high resolution image data for both eyes. Encoded symmetric-resolution image data for the 3D image may be distributed to a wide variety of devices for 3D image processing and rendering. A recipient device may reconstruct reduced resolution 3D image from one of the first multiplexed image frame or the second multiplexed image frame. A recipient device may also reconstruct high resolution 3D image by combining high resolution image data from both of the first multiplexed image frame and the second multiplexed image frame.

26 Claims, 18 Drawing Sheets

(51) Int. Cl.
*H04N 13/106* (2018.01)
*H04N 19/597* (2014.01)

(52) U.S. Cl.
CPC ....... *H04N 13/0059* (2013.01); *H04N 13/106* (2018.05); *H04N 19/119* (2014.11); *H04N 19/597* (2014.11)

(56) References Cited

U.S. PATENT DOCUMENTS

| | | | |
|---|---|---|---|
| 5,612,735 A | 3/1997 | Haskell | |
| 5,798,794 A * | 8/1998 | Takahashi | H04N 19/63 375/240.03 |
| 6,057,884 A | 5/2000 | Chen | |
| 6,101,277 A * | 8/2000 | Go | H04N 19/63 375/E7.04 |
| 6,141,446 A * | 10/2000 | Boliek | H03M 7/30 375/240.11 |
| 6,674,911 B1 * | 1/2004 | Pearlman | G06T 9/40 375/240.19 |
| 7,016,545 B1 * | 3/2006 | Schwartz | G06F 17/148 375/E7.016 |
| 7,065,260 B2 * | 6/2006 | Zhang | H04N 19/597 348/36 |
| 7,110,617 B2 * | 9/2006 | Zhang | H04N 19/597 348/36 |
| 7,262,767 B2 * | 8/2007 | Yamada | H04N 13/026 345/419 |
| 7,289,677 B2 * | 10/2007 | Schwartz | G06F 17/148 375/E7.016 |
| 7,382,925 B2 * | 6/2008 | Boliek | H03M 7/30 375/E7.044 |
| 7,515,759 B2 | 4/2009 | Sun | |
| 7,792,376 B2 * | 9/2010 | Mizuno | H04N 19/647 382/232 |
| 7,916,960 B2 * | 3/2011 | Mizuno | H04N 19/46 382/240 |
| 7,916,961 B2 * | 3/2011 | Mizuno | H04N 19/46 382/240 |
| 8,619,852 B2 | 12/2013 | Leontaris | |
| 2001/0001018 A1 * | 5/2001 | Boon | H03M 7/40 382/246 |
| 2003/0138158 A1 * | 7/2003 | Schwartz | G06F 17/148 382/240 |
| 2005/0158026 A1 * | 7/2005 | Shin | H04N 5/783 386/205 |
| 2006/0114993 A1 | 6/2006 | Xiong | |
| 2006/0165167 A1 * | 7/2006 | Kimoto | H04N 19/63 375/240.11 |
| 2008/0310497 A1 | 12/2008 | Amonou | |
| 2009/0268806 A1 | 10/2009 | Kim | |
| 2009/0324116 A1 * | 12/2009 | Takada | G06T 9/007 382/246 |
| 2010/0110163 A1 | 5/2010 | Bruls | |
| 2010/0165077 A1 | 7/2010 | Yin | |
| 2010/0202540 A1 | 8/2010 | Fang | |
| 2010/0231593 A1 | 9/2010 | Zhou | |
| 2010/0238274 A1 | 9/2010 | Kim | |
| 2010/0260268 A1 * | 10/2010 | Cowan | H04N 13/0048 375/240.25 |
| 2010/0278508 A1 * | 11/2010 | Aggarwal | H04N 21/2343 386/328 |
| 2011/0012994 A1 | 1/2011 | Park | |
| 2011/0074922 A1 | 3/2011 | Chen | |
| 2011/0096832 A1 * | 4/2011 | Zhang | H04N 13/0022 375/240.08 |
| 2011/0122230 A1 | 5/2011 | Boisson | |
| 2011/0134214 A1 | 6/2011 | Chen | |
| 2011/0141104 A1 * | 6/2011 | Tin | H04N 13/0025 345/419 |
| 2011/0216833 A1 | 9/2011 | Chen | |
| 2011/0261877 A1 | 10/2011 | Choi | |
| 2012/0236115 A1 | 9/2012 | Zhang | |

FOREIGN PATENT DOCUMENTS

| | | |
|---|---|---|
| JP | 2003-319416 | 11/2003 |
| TW | I243617 | 11/2005 |
| WO | 2010/101420 | 9/2010 |
| WO | 2010/123862 | 10/2010 |
| WO | 2010/126227 | 11/2010 |
| WO | 2011/005624 | 1/2011 |
| WO | 2011/005625 | 1/2011 |
| WO | 2011/094034 | 8/2011 |
| WO | 2011/094047 | 8/2011 |
| WO | 2013/040170 | 3/2013 |
| WO | 2013/049179 | 4/2013 |

OTHER PUBLICATIONS

Vetro, A. et al "3D-TV Content Storage and Transmission" IEEE Transactions on Broadcasting, IEEE Service Center, Piscataway, NJ, US, vol. 57, No. 2, Jun. 1, 2011, pp. 384-394.
Tourapis, Alexis Michael, et al "A Frame Compatible System for 3D Delivery" MPEG Meeting, Jul. 26-30, 2010, ISO/IEC JTC1/SC29/WG11, No. M17925.
Schwarz, H et al. "SVC Overview" JVT Meeting, Oct. 2006, JVT of ISO/IEC JTC1/SC29/WG11 and ITU-T SG 16.
Tourapis, A et al. "System Specification and Software of a Frame Compatible Full Resolution 3D Video Coding System" MPEG Meeting, Jul. 26-30, 2010, ISO/IEC JTC1/SC29/WG11, No. M17926.
Dolby Laboratories et al. "Dolby Open Specification for Frame-Compatible 3D Systems" Apr. 4, 2011, pp. 1-11.
Hewage, Chaminda "Quality Evaluation of Color Plus Depth Map-Based Stereoscopic Video" IEEE Journal of Selected Topics in Signal Processing, vol. 3, No. 2, Apr. 2009, pp. 304-318.
Vetro, A. et al. "3D-TV Content Storage and Tranmission" Mitsubishi Electric Research Laboratories, TR2011-023, Jan. 2011.
Quan, J et al. "Asymmetric Spatial Scalability in Stereoscopic Video Coding" 3DTV Conference: The True Vision—Capture, Transmission and Display of 3D Video, May 16-18, 2011.
Tseng, B. et al "Compatible Video Coding of Stereoscopic Sequences using MPEG-2's Scalability and Interlaced Structure" International Workshop on HDTV 1994.
ATSC "Final Report of the ATSC Planning Team on 3D-TV" Doc. PT1-049r1, Aug. 31, 2011.
Ji, X et al. "Three-Dimensional Subband Scalable Video Coding Embedded with H.264/AVC Codec" Visual Communications and Image Processing Jul. 1, 2005, Proc. of SPIE vol. 5960, pp. 201-209.
Aflaki, P. et al "Subjective Study on Compressed Asymmetric Stereoscopic Video" Proc. of 2010 IEEE 17th International Conference on Image Processing, Sep. 26-29, 2010, Hong Kong, pp. 4021-4024.

(56) References Cited

OTHER PUBLICATIONS

Stelmach, L. et al "Stereo Image Quality: Effects of Mixed Spatio-Temporal Resolution" IEEE Transactions on Circuits and Systems for Video Technology, vol. 10, No. 2, Mar. 2000, pp. 188-193.

* cited by examiner

FRAME-COMPATIBLE FULL-RESOLUTION STEREOSCOPIC 3D VIDEO DELIVERY WITH SYMMETRIC PICTURE RESOLUTION AND QUALITY

CROSS-REFERENCE TO RELATED APPLICATIONS

This application claims priority to U.S. Provisional patent application Ser. No. 61/541,005 filed on Sep. 29, 2011 and U.S. Provisional patent application Ser. No. 61/583,081 filed on Jan. 4, 2012, which are incorporated by reference in their entirety.

TECHNOLOGY

The present invention relates generally to image data. More particularly, an example embodiment of the present invention relates to image data for stereoscopic 3D images.

BACKGROUND

Frame-compatible half resolution (FCHR) solutions for 3D content delivery suffer from degraded spatial resolution because the half resolution 3D content only contains half resolution image frames subsampled from full resolution 3D image frames.

Under some techniques, frame-compatible full resolution (FCFR) solutions may be used to produce full resolution 3D image frames by sending half resolution 3D image frames through a base layer and sending complementary half resolution 3D image frames through an enhancement layer. The half resolution 3D image frames and the complementary half resolution 3D image frames may be combined by a recipient device into 3D image frames at full resolution.

However, these techniques implement low-pass filtering to reduce/remove aliasing in the half resolution image frames. As high frequency content in the image frames is removed by low-pass filtering, it is not possible for a downstream device to recover all the fine details and textures that were in the high spatial frequency content. While full resolution 3D image frames might still be constructed, the pixels in the 3D image frames would have been irreversibly altered by low-pass filtering and could not be used to reproduce the original resolution and sharpness in original 3D content that gives rise to the 3D image frames.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
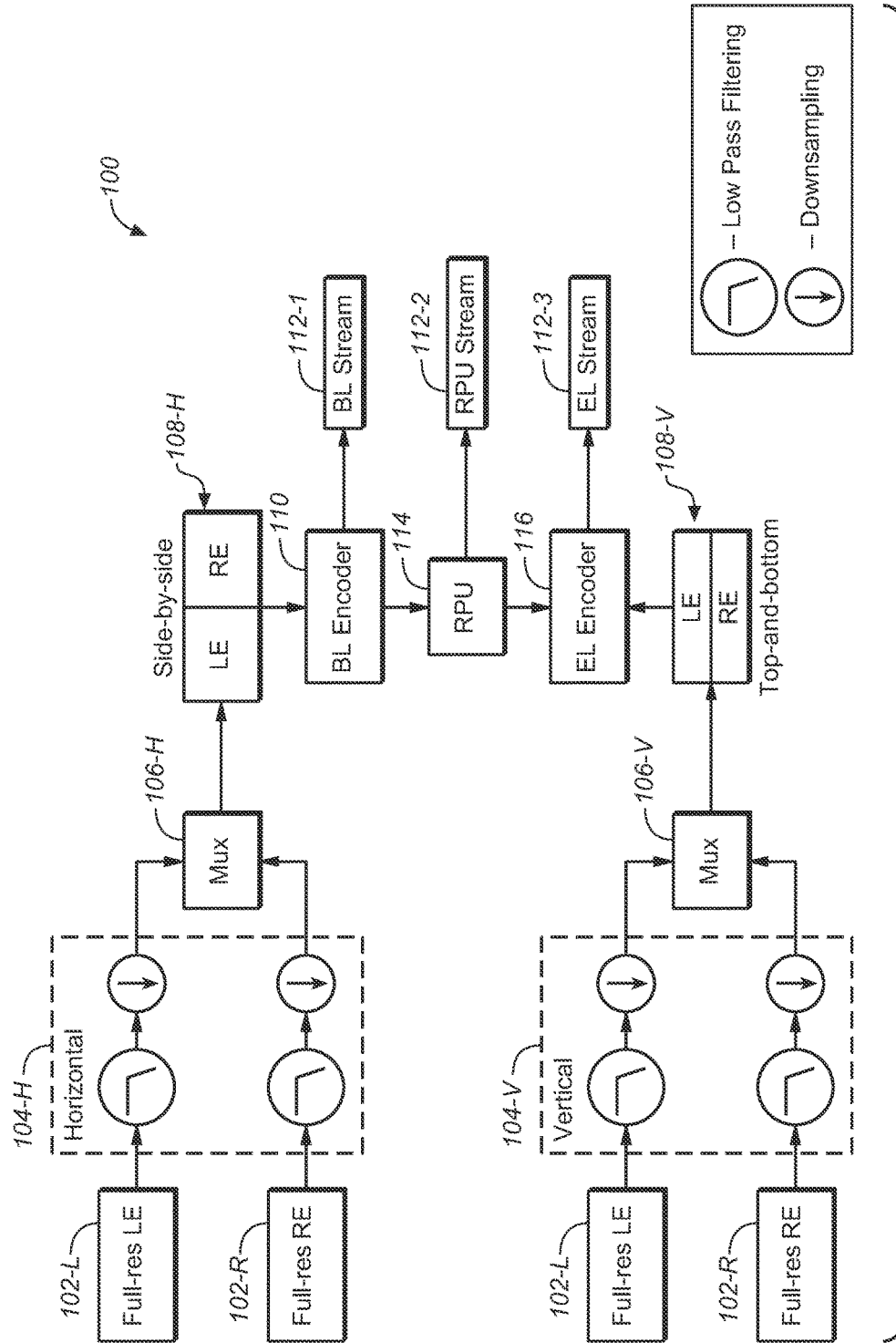
FIG. 1A illustrates a multi-layer video encoder that maintains high spatial frequency content present in input video sequence, in accordance with an embodiment of the invention.

Example embodiments, which relate to 3D video coding, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MULTI-LAYERED VIDEO DELIVERY
3. DEMULTIPLEXERS
4. SAMPLING FORMATS
5. INTERLACED VIDEO APPLICATIONS
6. RESIDUAL IMAGE CODING
7. EXAMPLE PROCESS FLOWS
8. RESIDUAL IMAGE CODING WITH CARRIER SIGNAL
9. IMPLEMENTATION MECHANISMS—HARDWARE OVERVIEW
10. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

Video data is currently received mostly through network connections, for example, from internet-based content providers. However, the bitrate allocated to a display application such as a 3D display application on a computing device is limited.

To support a widest possible variety of 3D image rendering devices, 3D image content may be delivered as frame compatible 3D image frames (or pictures) with reduced resolutions. As discussed, 3D image frames may be subsampled from full resolution 3D image frames to reduced resolution 3D image frames; high spatial frequency content in the full resolution 3D image frames may be removed by low-pass filters to prevent aliasing in the subsampled image frames.

Embodiments include encoding and providing symmetric high resolution 3D image data to downstream devices. In some example embodiments, a first multiplexed 3D image frame with reduced resolution in a horizontal direction and full resolution in a vertical direction is provided in one of a base layer and an enhancement layer to a recipient device, while a second multiplexed 3D image frame with reduced resolution in a vertical direction and full resolution in a horizontal direction is provided in the other of the base layer and the enhancement layer to the recipient device. Left eye (LE) and right eye (RE) image data in the enhancement layer may be combined by the recipient device with LE and RE image data in the base layer to reconstruct symmetric full resolution LE and RE image frames. One or both of the first multiplexed 3D image frame and the second multiplexed 3D image frame may be frame compatible to support reduced resolution (a less than full resolution, e.g., half resolution) 3D video applications.

Codecs implementing techniques as described herein may be configured to include inter-layer prediction capabilities to fully exploit statistical redundancy between a multiplexed 3D image frame in the base layer and input image frames. A multiplexed 3D image frame in the enhancement layer may (possibly only) carry residual or differential image data, instead of carrying a large amount of LE and RE image data without exploiting the statistical redundancy in image data of different layers. The residual or differential image data as provided in the enhancement layers enables downstream devices to construct symmetric full resolution LE and RE image frames by adding the residual or differential image data on top of the frame-compatible multiplexed 3D image frame in the base layer.

In some example embodiments, the codecs may be configured to include inter-view prediction capability used as described in ITU-T Recommendation H.264 and ISO/IEC 14496-10. In some example embodiments, a RPU (reference processing unit) may be used to improve efficiency in inter-layer prediction for enhancement layer compression.

In some embodiments, the multiplexed 3D image frames in both the base layer and the enhancement layer that comprise complementary high spatial frequency content may be transmitted to and/or rendered for viewing on high-end 3D displays. In addition, one (e.g., a frame compatible multiplexed 3D image frame) of the multiplexed 3D image frames may be transmitted to and/or rendered for viewing on relatively lower-end 3D displays.

In some example embodiments, data needed for other applications may also be included in one or more enhancement layers. In some example embodiments, a wide variety of features, as provided by FCFR technologies commercially available from Dolby Laboratories in San Francisco, Calif., may be supported by the base and enhancement layers as described herein.

Techniques as described herein provide solutions to achieving symmetric high resolution and high picture quality while maintaining backwards compatibility to a variety of relatively low-end video players. A display system implementing techniques as described herein is able to achieve better picture quality of reconstructed 3D pictures than other display systems implementing other FCFR schemes. Particularly, a display system as described herein is able to retain more high frequencies and reproduce sharper pictures with more details than the other display systems.

Techniques as described herein may be used to reduce bandwidth or bitrate usage and preserve frame-compatible 3D image data with reduced resolution, which supports various televisions, displays and other image rendering devices.

In addition, an option for interlaced 3D content may also be implemented under techniques as described herein. This option, for example, may be used to carry 3D broadcast applications such as sports programs.

In some embodiments, reuse, adaptation and improvement of some available system components allows relatively low cost implementation as compared with other approaches without using techniques as described herein.

In some example embodiments, mechanisms as described herein form a part of a media processing system, including but not limited to: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. MULTI-LAYERED VIDEO DELIVERY

Figure 1B:
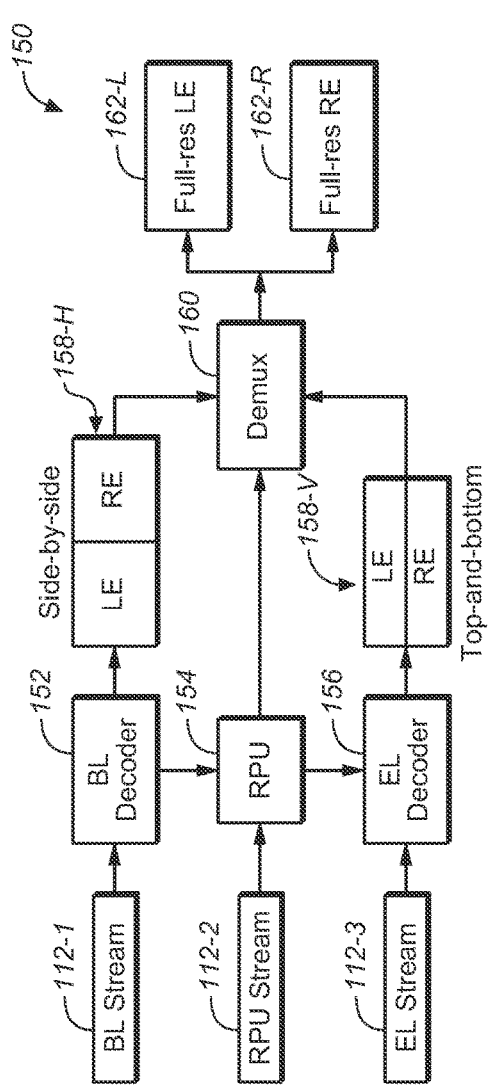
FIG. 1B illustrates a multi-layer video decoder that receives input video signals with high spatial frequency content, in accordance with an embodiment.

FIG. 1A illustrates a multi-layer video encoder (100) that maintains high spatial frequency content present in input video sequence, in accordance with an embodiment of the invention. FIG. 1B illustrates a multi-layer video decoder (150) that corresponds to the multi-layer video encoder (100) shown in FIG. 1A, in accordance with the example embodiment.

In an example embodiment, the multiple-layer video encoder (100) is configured to encode an input 3D video sequence. The input 3D video sequence consists of a sequence of 3D input images. A 3D input image in the sequence of 3D images comprises full resolution 3D image data that contains high spatial frequency content. As used herein, the term "full resolution" may refer to a spatial resolution maximally supported by the total number of independently settable pixels in an image frame. The full resolution 3D image data in a 3D input image may be initially decoded by the multiple-layer video encoder (100) into an input LE image frame (102-L) and an input RE image frame (102-R) both of which contain high spatial frequency content.

In an example embodiment, one or more filtering and subsampling mechanisms (e.g., 104-H and 104-V) in the multi-layer video encoder (100) generate LE and RE image data filtered in one of the vertical and horizontal and vertical directions but unfiltered in the other of the vertical and horizontal directions based on the input LE and RE image frames (102-L and 102-R).

For example, a filtering and subsampling mechanism (104-H) may be configured to filter high spatial frequency content in the horizontal direction from the input LE and RE image frames (102-L and 102-R) and horizontally subsample the LE and RE image frames (102-L and 102-R) as filtered in the horizontal direction into corresponding LE and RE portions. A multiplexer (106-H) may be configured to combine the LE and RE portions in a 3D multiplexed image frame (108-H) in a side-by-side format.

Similarly, a filtering and subsampling mechanism (104-V) may be configured to filter high spatial frequency content in the vertical direction from the input LE and RE image frames (102-L and 102-R) and vertically subsample the LE and RE image frames (102-L and 102-R) as filtered in the vertical direction into corresponding LE and RE portions. A multiplexer (106-V) may be configured to combine the LE and RE portions in a 3D multiplexed image frame (108-V) in a top-and-bottom format.

The filtering of the LE and RE image frames (102-L and 102-R) may remove all, or a substantial part, of the high spatial frequency content from the input LE and RE image frames (102-L and 102-R) in one of the horizontal and vertical directions. Filtering may be performed with one or more low-pass filters (LPFs) in the filtering and subsampling mechanisms (e.g., 104-H and 104-V). In an example embodiment, filtering as described herein removes or substantially dampens any spatial frequency content in the input images above a threshold frequency that corresponds to a fraction (e.g., one half or another fraction) of a spatial resolution supported by a multi-layer video decoder (e.g., 150) in one of the horizontal and vertical directions.

As used herein, the term "high spatial frequency content" in a spatial direction (horizontal or vertical) may refer to high spatial frequency image details that exist in an input 3D video sequence along the spatial direction. If the removal of the high spatial frequency content in the spatial direction had occurred, downstream devices would not be able to reproduce high resolution image details with filtered image data in the spatial direction.

As used herein, a subsampler in a filtering and sub sampling mechanism (104-H or 104-V) may be configured to preserve the high spatial frequency content in the direction perpendicular to the direction in which the high spatial frequency content has been filtered/removed. For example, a subsampler in the filtering and subsampling mechanism (104-H) may be configured to subsample (e.g., keep every other column) along the same horizontal direction in which the high spatial frequency content has been removed and to avoid subsampling along the vertical direction. Similarly, a subsampler in the filtering and subsampling mechanism (104-V) may be configured to subsample (e.g., keep every other row) along the same vertical direction in which the high spatial frequency content has been removed and to avoid subsampling along the vertical direction.

A multiplexed 3D image frame (one of 108-H and 108-V) comprises both a (e.g., down-sampled) image data portion for the left eye and a (e.g., down-sampled) image data portion for the right eye. The multiplexed 3D image frame may be decoded by a downstream device into a LE image frame and a RE image frame of reduced resolutions (e.g., half resolutions) in one of the horizontal and vertical directions. Such decoded LE and RE image frames of the reduced resolution may be up-sampled to comprise the same number of pixels as a full resolution image frame with a fuzzier look than a full resolution image not obtained by an up-sampling operation.

In an example embodiment, a multiplexed 3D image frame (108-H) comprises LE and RE image data portions, each of which comprises a reduced number (e.g., one half, less than one half, or another fewer than the total number) of the total number of pixels in a full resolution image frame, where the LE and RE image data portions comprise high spatial frequency content in the vertical direction, while the other multiplexed 3D image frame (108-V) comprises complementary LE and RE image data portions, each of which comprises a reduced number (e.g., one half, less than one half, or another fewer than the total number) of the total number of pixels in a full resolution image frame, where the complementary LE and RE image data portions comprise high spatial frequency content in the horizontal direction. LE and RE image data portions may be multiplexed within a multiplexed 3D image frame (e.g., one of 108-H and 108-V) in a side-by-side format, an over-under format, a quincunx format, a checkerboard format, an interleaved format, a combination of the foregoing formats, or another multiplex format.

One or more enhancement layers may be used to carry a first multiplexed 3D image frame (e.g., one of 108-H and 108-V) that may be combined with a second multiplexed 3D image frame (e.g., the other of 108-H and 108-V) in a base layer. A multi-layer video decoder (e.g., 150) as described herein may be configured to produce image frames with high spatial resolution content in both vertical and horizontal directions based on the first and second multiplexed 3D image frame (e.g., 108-H and 108-V). In an example embodiment, the BL encoder (110) generates, based at least in part on the first multiplexed 3D image frame (e.g., 108-H), a base layer video signal to be carried in a base layer frame compatible video stream (BL FC video stream 112-1), while the EL encoder (116) generates, based at least in part on the second multiplexed 3D image frame (e.g., 108-V), an enhancement layer video signal to be carried in an enhancement layer frame compatible video stream (EL FC video stream 112-3). One or both of the BL encoder (110) and the EL encoder (116) may be implemented using one or more of a plurality of codecs, such as H.264/AVC, VP8, VC-1, and/or others.

An enhancement layer video signal as described herein may be generated using a hybrid video coding method (e.g., implemented by video codecs, such as VC-1, H.264/AVC, and/or others). The image data in the multiplexed 3D image frame 108-V may be predicted either from neighboring samples in the same image frame (using intra prediction) or from samples from past decoded image frames (inter prediction) that belong to the same layer and are buffered as motion-compensated prediction references within a prediction reference image frame buffer. Inter-layer prediction may also be at least in part based on decoded information from other layers (e.g., the base layer, etc.).

Additionally and/or optionally, the multi-layer video encoder (100) may comprise a reference processing unit (RPU, 114) to perform operations relating to prediction. Prediction as implemented by the reference processing unit (114) may be used to reduce the redundant data and overhead in constructing multiplexed 3D image frames in the multi-layer video decoder (150). The RPU (114) may receive and make use of BL image data and other prediction-related information from the BL Encoder 110, and generate a prediction reference image frame through intra or inter prediction.

In those example embodiments that make use of such predictions, the EL encoder (116) generates, based at least in part on the second multiplexed 3D image frame (108-V) and the prediction reference image frame, multiplexed 3D image residuals or differences between the prediction reference image frame and the second multiplexed 3D image frame 108-V and stores the image residuals in the enhancement layer video signal to be carried in the EL FC video stream (112-3). Further, based on the prediction and coding process, the RPU (114) may generate coding information which can be transmitted to a decoder as metadata using an RPU stream (112-2).

FIG. 1B illustrates a multi-layer video decoder (150) that receives input video signals in which high spatial frequency content from an original video sequence (which may be the input video sequence as discussed in connection with FIG. 1A) in two orthogonal directions has been preserved in complementary image data carried in the enhancement layer and in the base layer, respectively, in accordance with an embodiment. In an example embodiment, the input video signals are received in multiple layers (or multiple bit-streams). As used herein, the term "multi-layer" or "multiple layers" may refer to two or more bitstreams that carries input video signals having one or more logical dependency relationships between one another (of the input video signals).

In an example embodiment, the multi-layer video decoder (150) is configured to decode one or more input video signals in the BL FC video stream (112-1 of FIG. 1B), EL RPU stream (112-2 of FIG. 1B), and EL FC video stream (112-3 of FIG. 1B) into a sequence of (full resolution) 3D output images. A 3D output image in the sequence of 3D output images as decoded by the multi-layer video decoder (150) comprise high spatial resolution content for both eyes, as high spatial frequency content in the original video sequence that gives rise to the input video signals has been preserved in both horizontal and vertical directions.

In an example embodiment, a BL decoder (152) generates, based at least in part on a BL video signal received from BL FC video stream (112-1 of FIG. 1B), a first multiplexed 3D image frame (158-H), while an EL decoder (156) generates, based at least in part on an EL video signal received from EL FC video stream (112-3 of FIG. 1B), a second multiplexed 3D image frame (158-V). One or both of the BL decoder (152) and the EL decoder (156) may be implemented using one or more of a plurality of codecs, such as H.264/AVC, VP8, VC-1, and/or others.

In the embodiments that make use of prediction, a decoder-side RPU (154) generates, based at least in part on a reference video signal received from EL RPU stream (112-2 of FIG. 1B) and/or BL image data from the BL decoder (152), a prediction reference image frame. Further, EL decoder (156) generates, based at least in part on the EL video signal in EL FC video stream (112-3 of FIG. 1B) and the prediction reference image frame from the RPU (154), the second multiplexed 3D image frame (158-V).

The multi-layer video decoder (150) may combine complementary image data received in one or more enhancement layers (e.g., EL RPU stream 112-2 and EL FC video stream 112-3) with image data received in a base layer (e.g., BL FC video stream 112-1) to produce full resolution LE and RE output image frames (e.g., 162-L and 162-R) that comprise high spatial frequency content in both vertical and horizontal directions. For example, a demultiplexer (De-Mux, 160) may be configured to de-multiplex the multiplexed 3D image frames (158-H and 158-V) into the LE and RE output image frames (162-L and 162-R) with high spatial frequency content. While the multiplexed 3D image frames (158-H and 158-V) each comprise image data for both left and right eyes, each of the LE and RE output image frames (162-L and 162-R) is only for one of left and right eyes. A first LE image data portion in the first multiplexed 3D image frame (158-H) may be combined with a second LE image data portion in the second multiplexed 3D image frame (158-V) to form the LE output image (162-L) that comprises high spatial frequency content in both vertical and horizontal directions. Similarly, a first RE image data portion in the first multiplexed 3D image frame (158-H) may be combined with a second RE image data portion in the second multiplexed 3D image frame (158-V) to form the RE output image (162-R) that comprises high spatial frequency content in both vertical and horizontal directions.

The full resolution LE and RE output image frames (162-L and 162-R) both of which comprise high spatial frequency content in both vertical and horizontal directions may be rendered by a display device (which, for example, may comprise the multi-layer video decoder 150) to present a full resolution output 3D image. Rendering the full resolution LE and RE output image frames may, but is not limited to, be in a frame-sequential manner. Because high spatial frequency content has been preserved in the video signals as received by the multi-layer video decoder (150), the full resolution output 3D image contains high spatial frequency image details that may exist in an original 3D image (which may be one of the 3D input images of FIG. 1A).

Figure 1C:
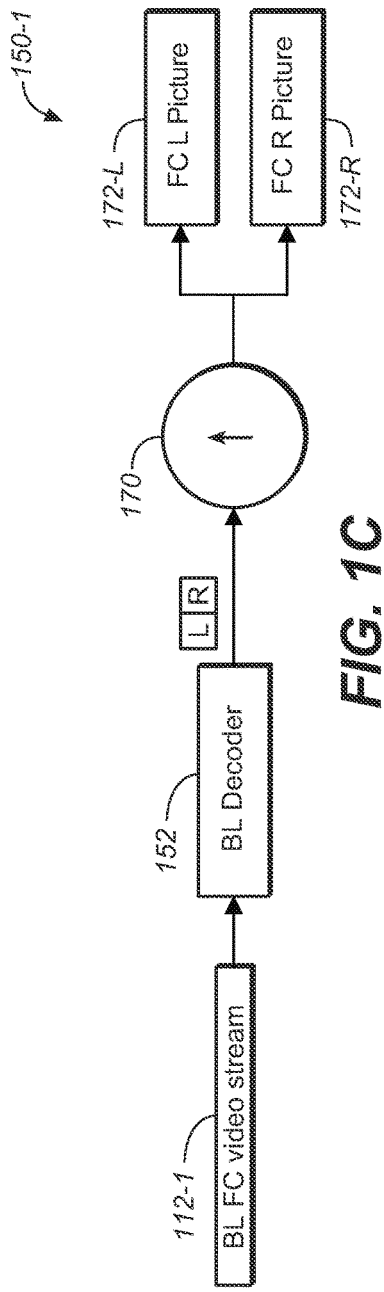
FIG. 1C illustrates a base-layer video decoder, in accordance with an embodiment.

FIG. 1C illustrates a base-layer video decoder (150-1) that receives one or more input video signals generated from an original video sequence (which may be the input video sequence as discussed in connection with FIG. 1A), in accordance with an embodiment. In an example embodiment, the base-layer video decoder (150-1) is configured to decode a BL input video signal as received from a base layer (BL FC video stream 112-1 of FIG. 1C) into a sequence of 3D output images, regardless of whether video signals in other layers may be present or not in physical signals received by the decoder. In an example embodiment, the base-layer video decoder (150-1) is configured to ignore any presence of video signals in other streams other than the BL FC video stream (112-1).

A 3D output image in the sequence of 3D output images as produced by the base layer video decoder (150-1) does not comprise full resolution 3D image data, as high spatial frequency content along one of the vertical and horizontal directions in the original video sequence that gives rise to the input video signals has been filtered/removed in the base layer video signal and cannot be recovered by the base-layer video decoder (150-1).

In an example embodiment, a BL decoder (152 of FIG. 1C) generates, based at least in part on the BL input video signal in BL FC video stream (112-1 of FIG. 1C), a multiplexed 3D image frame (e.g., 158-H of FIG. 1C). The BL decoder (152 of FIG. 1C) may be implemented using one or more of a plurality of codecs, such as H.264/AVC, VP8, VC-1, and/or others.

In an example embodiment, an up-sampling unit (170) de-multiplexes and/or separates the multiplexed 3D image frame (158-H) into two image data portions. While the multiplexed 3D image frame (158-H) comprises multiplexed filtered image data for both left and right eyes, the image data portions comprise a filtered LE image data portion and a filtered RE image data portion, each of which is at a reduced resolution below the full resolution. In an example embodiment, the up-sampling unit (170) up-samples (e.g., expanding along the horizontal direction) the filtered LE image data portion to form an up-sampled LE filtered output image frame (172-L). Similarly, the up-sampling unit (170) up-samples (e.g., expanding along the horizontal direction) the filtered RE image data portion to form an up-sampled RE filtered output image frame (172-R). Even though each of the up-sampled LE and RE filtered image frames (172-L and -R) may comprise the same number of pixels as a full resolution image frame, the rendered 3D image with the up-sampled LE and RE filtered image frames (172-L and -R) has a fuzzier look than a 3D image made up of full resolution LE and RE image frames (162-L and -R of FIG. 1B) not obtained by an up-sampling operation. In addition, the up-sampled LE and RE filtered image frames (172-L and -R) do not have high spatial frequency image details removed in the encoding process of the BL video signals (which may be derived from, for example, 112-1 of FIG. 1A).

The up-sampled LE and RE filtered image frames (172-L and -R) below the full resolution may be rendered by a display device (which for example may comprise the base-layer video decoder 150-1) to present an output 3D image. Rendering the up-sampled LE and RE filtered image frames (172-L and -R) may, but is not limited to, be in a frame-sequential manner.

3. DEMULTIPLEXERS

Figure 2:
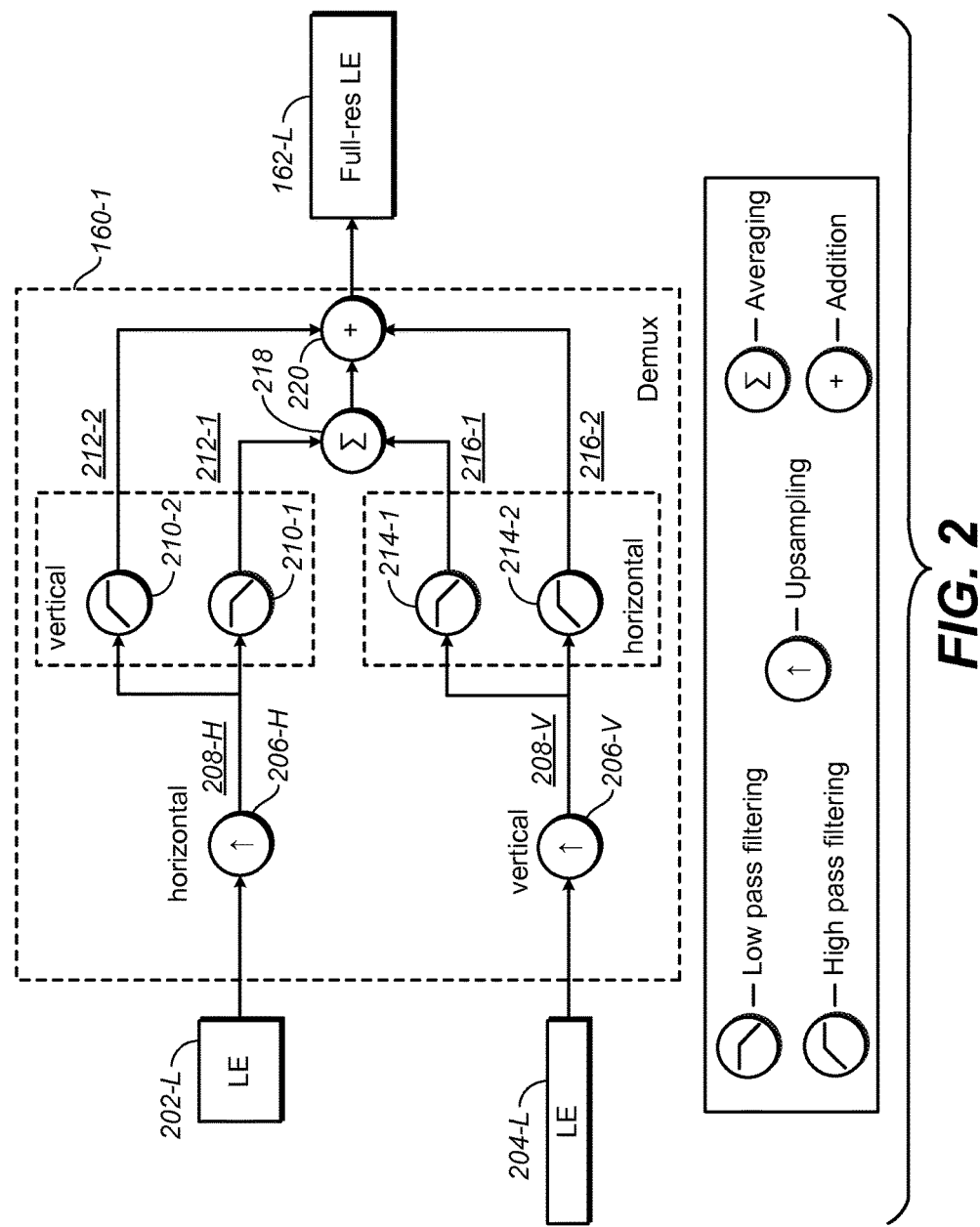
FIG. 2, FIG. 3, and FIG. 4 illustrate different configurations of demultiplexers, according to some example embodiments.

FIG. 2, FIG. 3, and FIG. 4 illustrate different configurations of demultiplexer 160 of FIG. 1B, according to some example embodiments. Each of the demultiplexers (160-1 through 160-5) may be configured to accept a first LE portion (202-L) decoded/derived from a first multiplexed 3D image frame (e.g., 158-H) and a second LE portion (204-L) decoded/derived from a second multiplexed 3D image frame (e.g., 158-V). The first LE portion (202-L) may comprise high spatial frequency content in one (for example, vertical direction) of the vertical and horizontal directions, while the second LE portion (204-L) may comprise high spatial frequency content in the other (horizontal direction in the same example) of the vertical and horizontal directions.

Each of the demultiplexers (160-1 through 160-5) may be configured to process and combine the first LE portion (202-L) and the second LE portion (204-L) to generate a full resolution LE image frame (162-L) that comprises high spatial frequency content in both vertical and horizontal directions.

A demultiplexer similar to each of the demultiplexers (160-1 through 160-5) may be configured to accept a first RE portion decoded/derived from the first multiplexed 3D image frame (158-H) and a second RE portion decoded/derived from the second multiplexed 3D image frame (158-V). The first RE portion may comprise high spatial frequency content in the vertical direction, while the second RE portion may comprise high spatial frequency content in the horizontal direction. The demultiplexer may be configured to process and combine the first RE portion and the second RE portion to generate a full resolution RE image frame (e.g., 162-R of FIG. 1B) that comprises high spatial frequency content in both vertical and horizontal directions.

As illustrated in FIG. 2, an up-sampler (206-H) in the demultiplexer (160-1) may be configured to up-sample the first LE portion (202-L) in the horizontal direction to create a first LE image frame (208-H). Similarly, an up-sampler 206-V in the demultiplexer (160-1) may be configured to up-sample the second LE portion (204-L) in the vertical direction to create a second LE image frame (208-V).

A first low pass filter (210-1) and a first high pass filter (210-2) may be applied to the first LE image frame (208-H) to yield a first low pass LE image frame (212-1) and a first high pass LE image frame (212-2). Similarly, a second low pass filter (214-1) and a second high pass filter (214-2) may be applied to the second LE image frame (208-V) to yield a second low pass LE image frame (216-1) and a second high pass LE image frame (216-2).

An averaging unit (218) in the demultiplexer (160-1) may be configured to accept the first low pass LE image frame (212-1) and the second low pass LE image frame (216-1) as input and to apply an averaging operation on the first low pass LE image frame (212-1) and the second low pass LE image frame (216-1) to generate a low pass averaged LE image frame.

An adder (220) in the demultiplexer (160-1) may be configured to accept the first high pass LE image frame (212-2), the second high pass LE image frame (216-2) and the low pass averaged LE image frame as input and to apply an adding operation on the first high pass LE image frame (212-2), the second high pass LE image frame (216-2) and the low pass averaged LE image frame to generate the full resolution LE image frame (162-L) that comprises high spatial frequency content in both vertical and horizontal directions.

Figure 3A:
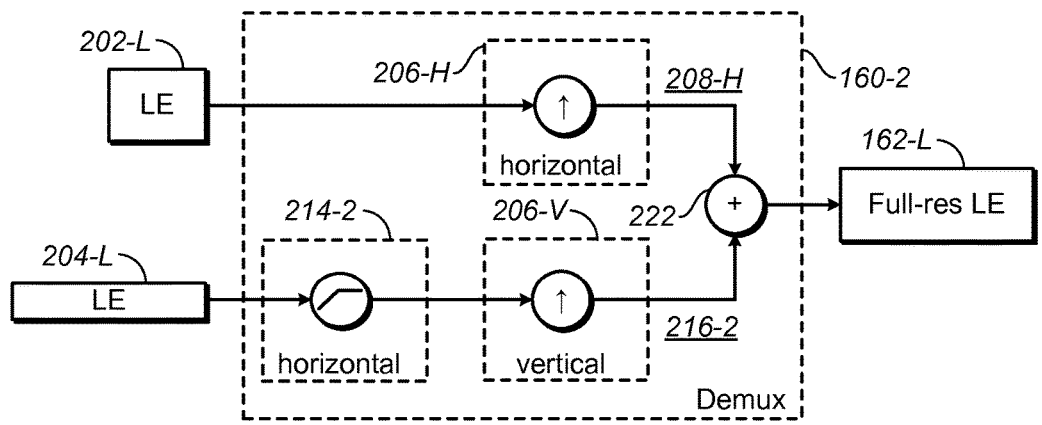
Figure 3B:
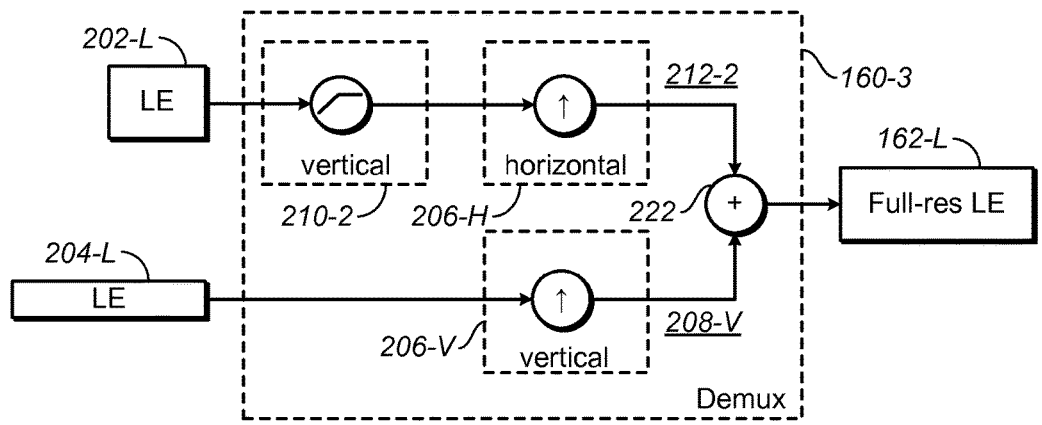

In some embodiments, low pass filtering have been applied by a multi-layer video encoder (e.g., 100 of FIG. 1A), for example, for anti-aliasing purposes. The demultiplexer (160-1) of FIG. 2 may be simplified according to some embodiments as illustrated in FIG. 3A and FIG. 3B. In these embodiments, decoding complexity may be reduced by eliminating low pass filters (e.g., 210-1 and 214-1) and an averaging unit (218) that may be used in the multiplexer 160-1 of FIG. 2.

As illustrated in FIG. 3A, an up-sampler (206-H) in the demultiplexer (160-2) may be configured to up-sample the first LE portion (202-L) in the horizontal direction to create a LE image frame (208-H) that comprises high spatial frequency content in the vertical direction.

A high pass filter (214-2) that preserves high spatial frequency content in the horizontal direction may be applied to the second LE portion (202-L) to yield a high pass LE portion. An up-sampler 206-V in the demultiplexer (160-2) may be configured to up-sample the high pass LE portion in the vertical direction to create a high pass LE image frame (216-2) that comprises high spatial frequency content in the horizontal direction.

An adder (222) in the demultiplexer (160-2) may be configured to accept the high pass LE image frame (216-2) and the LE image frame (208-H) as input and to apply an adding operation on the high pass LE image frame (216-2) and the LE image frame (208-H) to generate the full resolution LE image frame (162-L) that comprises high spatial frequency content in both vertical and horizontal directions.

In some embodiments, instead of using a demultiplexer (160-2) as illustrated in FIG. 3A to derive full resolution LE image frame (e.g., 162-L), a demultiplexer (160-3) as illustrated in FIG. 3B may be used. In FIG. 3B, an up-sampler (206-V) in the demultiplexer (160-3) may be configured to up-sample the second LE portion (204-L) in the vertical direction to create a LE image frame (208-V) that comprises high spatial frequency content in the horizontal direction.

A high pass filter (210-2) that preserves high spatial frequency content in the vertical direction may be applied to the first LE portion (202-L) to yield a high pass LE portion. An up-sampler 206-H in the demultiplexer (160-3) may be configured to up-sample the high pass LE portion in the horizontal direction to create a high pass LE image frame (212-2) that comprises high spatial frequency content in the vertical direction.

An adder (222) in the demultiplexer (160-3) may be configured to accept the high pass LE image frame (212-2) and the LE image frame (208-V) as input and to apply an adding operation on the high pass LE image frame (212-2) and the LE image frame (208-V) to generate the full resolution LE image frame (162-L) that comprises high spatial frequency content in both vertical and horizontal directions.

Figure 4A:
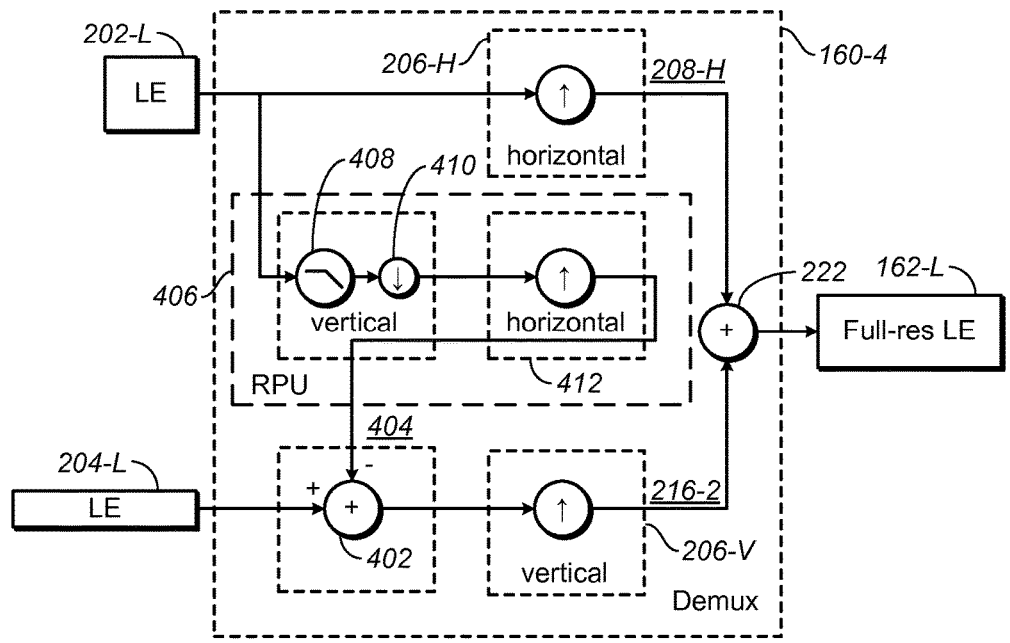

In some embodiments, instead of using a high pass filter (e.g., 214-2 of FIG. 3A or 210-2 of FIG. 3B) in a demultiplexer (160-2 or 160-3) as illustrated in FIG. 3A and FIG. 3B to derive full resolution LE image frame (e.g., 162-L), a subtraction operation as illustrated in FIG. 4A may be used. In contrast to high pass filtering operations, a subtraction operation such as 402 may require less computational complexity.

For the purpose of illustration only, the first LE portion (202-L) may be decoded from a BL video signal, while the second LE portion (204-L) may be decoded from an EL video signal. As illustrated in FIG. 4A, a reference LE portion 404, which may be of the same spatial dimensions of the second LE portion (204-L), may be generated based on the first LE portion (202-L) by RPU 406 (which may be, for example, 154 of FIG. 1B) during an inter-layer prediction process. In some embodiments, a processing path or sub-path comprising a low pass filter (408) in the vertical direction (which removes high spatial frequency content in the vertical direction), a vertical subsampler (410; which may keep, for example, every other row), and a horizontal up-sampler (412) may be used to generate the reference LE portion 404.

The subtraction operation (402) may be configured to accept the reference LE portion 404 (which has been removed high spatial frequency content in the vertical direction in addition to the high spatial frequency content in the horizontal direction removed by an upstream multi-layer video encoder (e.g., 100 of FIG. 1A)) and the second LE portion (204-L) as input and to subtract the second LE portion (204-L) by the reference LE portion 404 to generate a high pass LE portion that comprises high spatial frequency content in the horizontal direction only. In some embodiments, the high pass LE portion as described herein may be equivalent to the high pass LE portion generated by the high pass filter (214-2) of FIG. 3A.

Similar to the demultiplexer (160-2) of FIG. 3A, the demultiplexer (160-4) of FIG. 4A may comprise an up-sampler 206-V that may be configured to up-sample the high pass LE portion in the vertical direction to create a high pass LE image frame (216-2) that comprises high spatial frequency content in the horizontal direction.

An adder (222) in the demultiplexer (160-4) may be configured to accept the high pass LE image frame (216-2) and a LE image frame (208-H) (generated from the first LE portion 202-L by a horizontal up-sampler 206-H) as input and to apply an adding operation on the high pass LE image frame (216-2) and the LE image frame (208-H) to generate the full resolution LE image frame (162-L) that comprises high spatial frequency content in both vertical and horizontal directions.

Figure 4B:
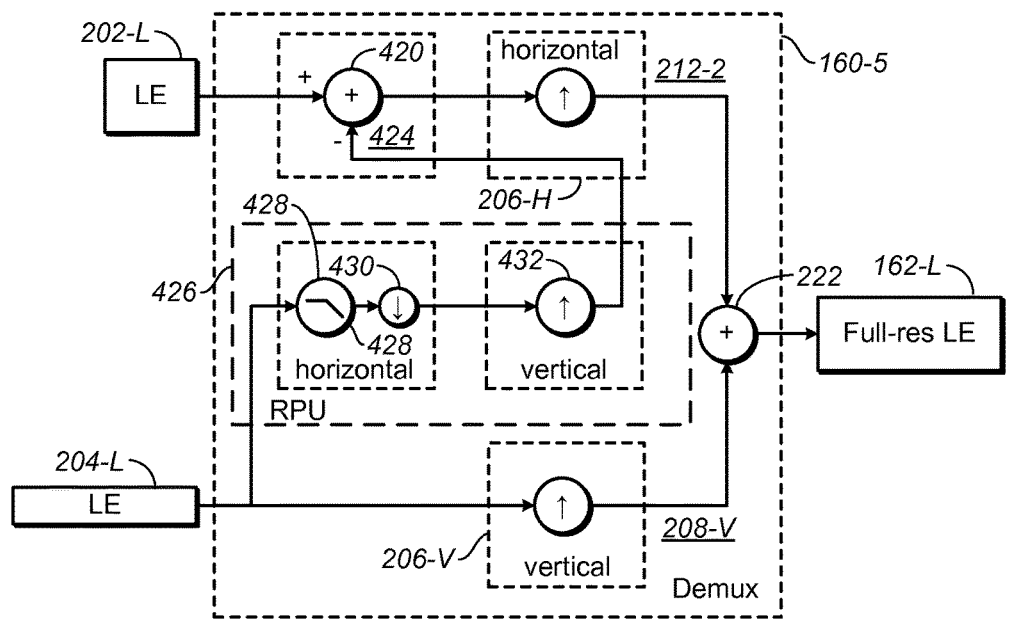

As illustrated in FIG. 4B, a reference LE portion 424, which may be of the same spatial dimensions of the first LE portion (202-L), may be generated based on the second LE portion (204-L) by RPU 426 (which may be, for example, 154 of FIG. 1B) during an inter-layer prediction process. In some embodiments, a processing path or sub-path comprising a low pass filter (428) in the vertical direction (which removes high spatial frequency content in the vertical direction), a vertical subsampler (430; which may keep, for example, every other row), and a horizontal up-sampler (432) may be used to generate the reference LE portion 404.

A subtraction operation (422) in the demultiplexer (160-5) may be configured to accept the reference LE portion 424 (which has been removed high spatial frequency content in the horizontal direction in addition to the high spatial frequency content in the vertical direction removed by an upstream multi-layer video encoder (e.g., 100 of FIG. 1A)) and the first LE portion (202-L) as input and to subtract the first LE portion (202-L) by the reference LE portion 424 to generate a high pass LE portion that comprises high spatial frequency content in the vertical direction only. In some embodiments, the high pass LE portion as described herein may be equivalent to the high pass LE portion generated by the high pass filter (210-2) of FIG. 3B.

Similar to the demultiplexer (160-3) of FIG. 3B, the demultiplexer (160-5) of FIG. 4B may comprise an up-sampler 206-H that may be configured to up-sample the high pass LE portion in the horizontal direction to create a high pass LE image frame (212-2) that comprises high spatial frequency content in the vertical direction.

An adder (222) in the demultiplexer (160-5) may be configured to accept the high pass LE image frame (212-2) and a LE image frame (208-V) (generated from the second LE portion 204-L by a vertical up-sampler 206-V) as input and to apply an adding operation on the high pass LE image frame (212-2) and the LE image frame (208-V) to generate the full resolution LE image frame (162-L) that comprises high spatial frequency content in both vertical and horizontal directions.

4. SAMPLING FORMATS

Figure 5:
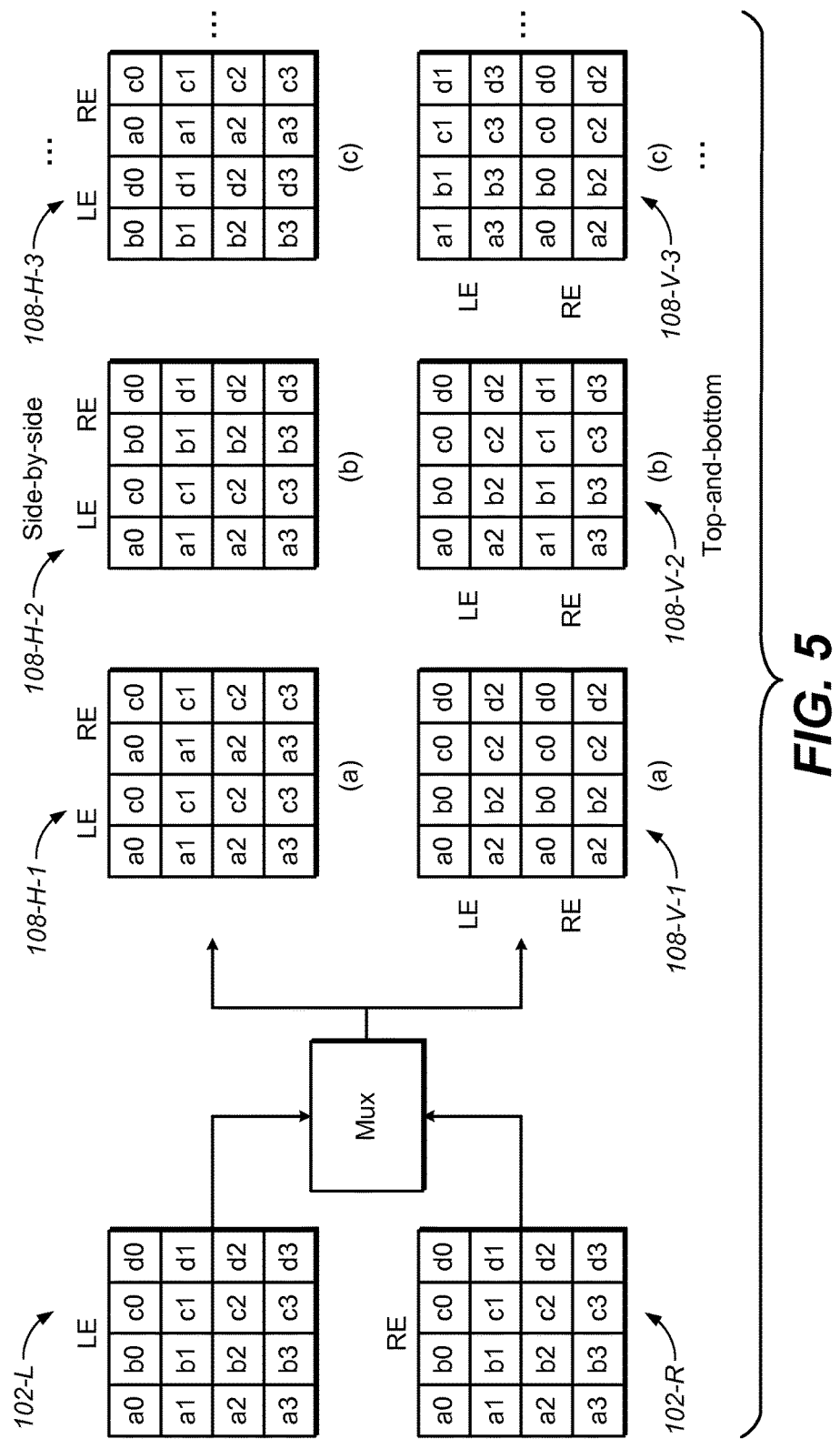
FIG. 5 illustrates multiplexing formats, in some example embodiments.

FIG. 5 illustrates multiplexing formats, in some example embodiments. As illustrated, an LE image frame (e.g., 102-L or an LE image derived there from) and an RE image frame (e.g., 102-R or an RE image derived there from) may comprise LE and RE pixel values for a plurality of pixels ($a_i$, $b_i$, $c_i$, $d_i$, etc., wherein i may be a positive integer) in a 3D image frame. In some embodiments, a side-by-side multiplexed image frame such as the multiplexed image frame 108-H of FIG. 1A may use any of a plurality of side-by-side multiplexing formats (108-H-1, 108-H-2, 108-H-3, or other side-by-side multiplexing formats) to host image data horizontally subsampled from the LE and RE image frames (102-L and 102-R). In some embodiments, a top-and-bottom multiplexed image frame such as the multiplexed image frame 108-V of FIG. 1A may use any of a plurality of top-and-bottom multiplexing formats (108-V-1, 108-V-2, 108-V-3, or other side-by-side multiplexing formats) to host image data vertically subsampled from the LE and RE image frames (102-L and 102-R).

A multiplexer such as 106-H or 106-V of FIG. 1 may make one or more selections of multiplexing formats from the pluralities of multiplexing formats based on one or more factors (e.g., related to subsampling methods adopted by the multiplexer) and may signal the selections of multiplexing formats to a multi-layer video decoder (e.g., 150 of FIG. 1B) as metadata using, for example, an RPU stream 112-2. An RPU unit (e.g., 406 of FIG. 4A or 426 of FIG. 4B) in the multi-layer video decoder (150) may construct an inter-layer reference frame or image portion (e.g., 404 of FIG. 4A or 424 of FIG. 4B) based on an multiplexed 3D image frame (e.g., corresponding to 108-H of FIG. 1A) decoded from a BL video signal, taking into consideration the adopted subsampling methods used by the upstream multi-layer video encoder in generating the multiplexed 3D image frames (108-H and 108-V) (differentially or non-differentially) encoded in both BL and EL layers.

5. INTERLACED VIDEO APPLICATIONS

Figure 6A:
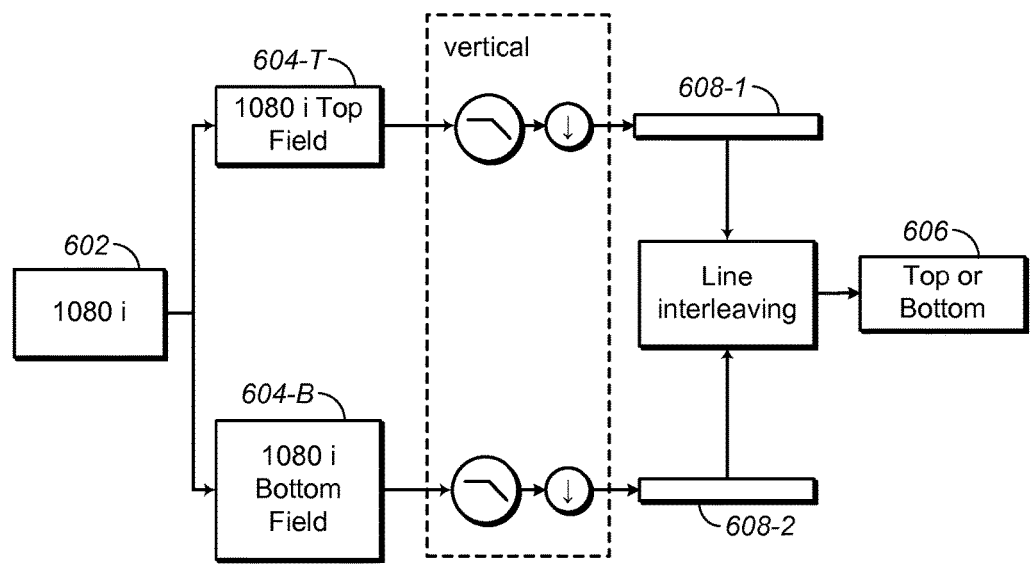
FIG. 6A and FIG. 6B illustrate interlaced content of a perspective forming image portions in a top-and-bottom and a side-by-side format, in some example embodiments.

FIG. 6A illustrates interlaced content (602) of the same perspective (either left eye or right eye) forming an image portion (606) in a top-and-bottom format, in some example embodiments. In FIG. 6A, the interlaced content (602) may be first demultiplexed into a (e.g., 1080i) top field (604-T) for a first time equal to t and a (e.g., 1080i) bottom field (604-B) for a second time equal to t+1. In FIG. 6A, each of the top field (604-T) and the bottom field (604-B) may be vertically filtered and vertically sub sampled to a first half field (608-1) (e.g., with one half, or with less than one half of the full spatial resolution or with another lower than the full spatial resolution, in the vertical direction) and a second half field (608-2) (e.g., with one half, or with less than one half of the full spatial resolution or with another lower than the full spatial resolution, in the vertical direction). Further, in FIG. 6A, the first half field (608-1) and the second half field (608-2) may be interleaved into a top or bottom field (606) in a first interlaced image frame.

Figure 6B:
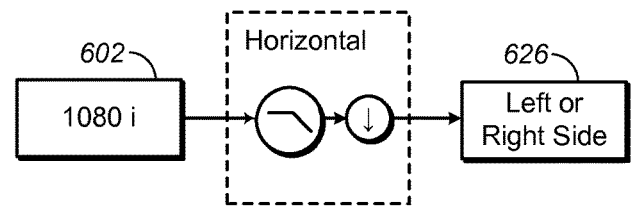

FIG. 6B illustrates interlaced content (602) of the same perspective (either left eye or right eye) forming an image portion (626) in a side-by-side format, in some example embodiments. In some embodiments, the interlaced content (602) is not required to be demultiplexed into two separate fields before horizontal filtering and horizontal subsampling and then interlaced into the image portion (626). Instead, the interlaced content (602) may be directly horizontally filtered and horizontally subsampled into the image portion (626). The operations illustrated in FIG. 6B may be performed for each of the LE and RE perspectives, and may constitute one half of the filtering and sampling mechanism (104-H).

Operations described in FIG. 6A and FIG. 6B may be applied to each of the left eye and right eye perspective, thereby forming the first interleaved image frame in a top-and-bottom format (as illustrated in part in FIG. 6A) and the second interleaved image frame in a side-by-side bottom format (as illustrated in part in FIG. 6B). One of the first interleaved frame and the second interleaved frame may be carried in the BL video signal, while the other (either differentially or non-differentially encoded) interleaved frame may be carried in the EL video signal. As a result, one (e.g., the first interleaved image frame in the present example) of the first interleaved image frame and the second interleaved image frame carries high spatial frequency content in the horizontal direction, while the other (e.g., the second interleaved image frame in the present example) of the first interleaved image frame and the second interleaved image frame carries high spatial frequency content in the vertical direction.

Figure 7:
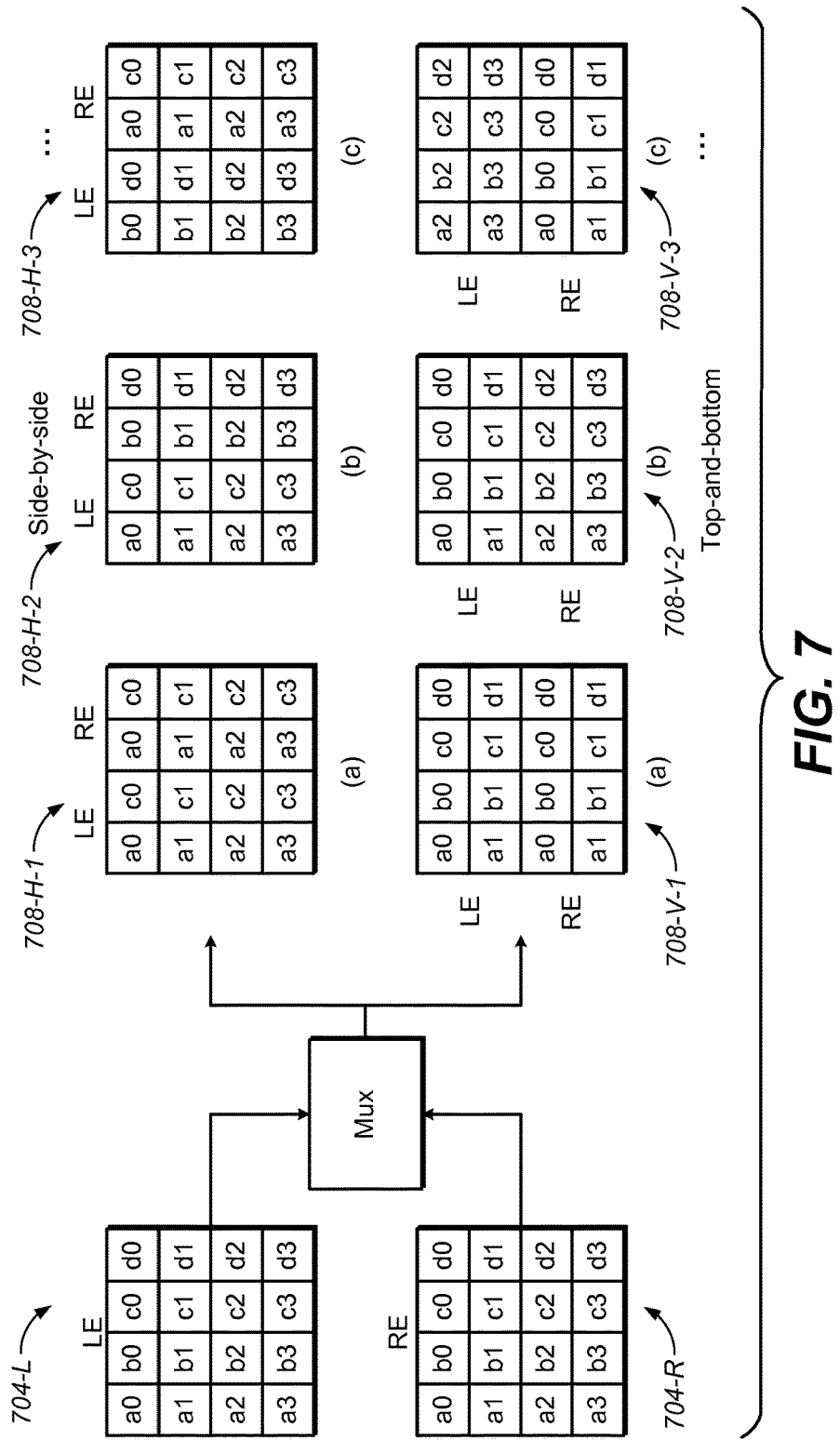
FIG. 7 illustrates multiplexing formats for carrying interlaced content, in some example embodiments.

FIG. 7 illustrates multiplexing formats for carrying interlaced content, in some example embodiments. As illustrated in FIG. 6A and FIG. 6B, low pass filtering and subsampling in the horizontal or vertical direction may be field based for interlaced content. A left image field (708-L) and a right image field (708-R) may correspond to LE and RE perspectives of the interlaced content for a time equal to t, respectively. Pixel values of one of the left image field (708-L) and the right image field (708-R) may be used to populate a left or right side of any of a plurality of multiplexing (or subsampling) formats (708-H-1, 708-H-2, 708-H-3, etc.) as shown in FIG. 7 when horizontal filtering and horizontal subsampling are applied as illustrated in FIG. 6B. Similarly, pixel values of one of the left image field (708-L) and the right image field (708-R) may be used to populate a top or bottom of any of a plurality of multiplexing (or subsampling) formats (708-V-1, 708-V-2, 708-V-3, etc.) as shown in FIG. 7 when vertical filtering and horizontal subsampling are applied as illustrated in FIG. 6A. In some embodiments, subsampled image data from all image fields, of both LE and RE perspectives and corresponding to both of the first time equals to t and the second time equals to t+1, is present in a top-and-bottom format applied to interlaced content.

6. RESIDUAL IMAGE CODING

Figure 8A:
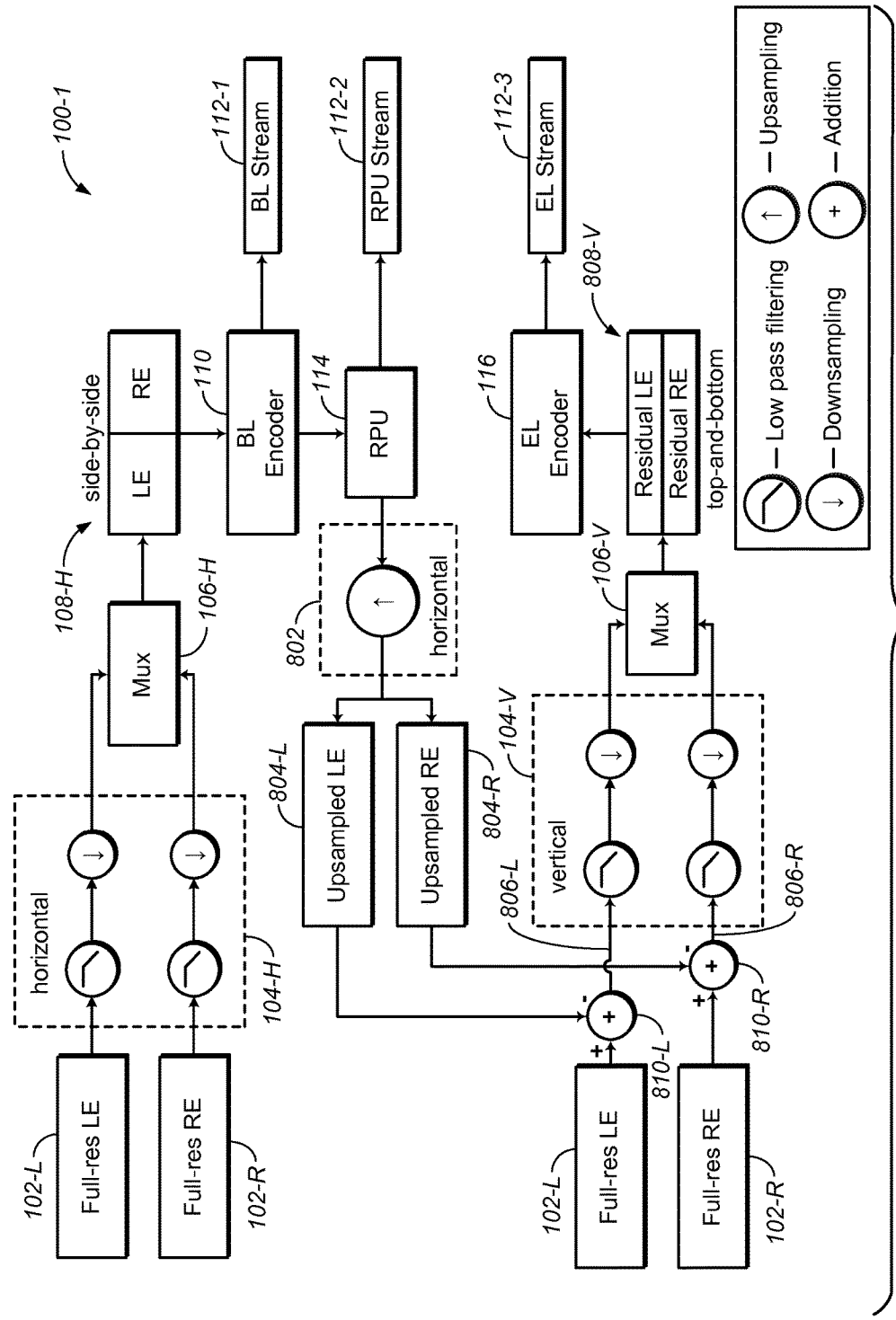
FIG. 8A illustrates a multi-layer video encoder, in accordance with an embodiment of the invention.
Figure 8B:
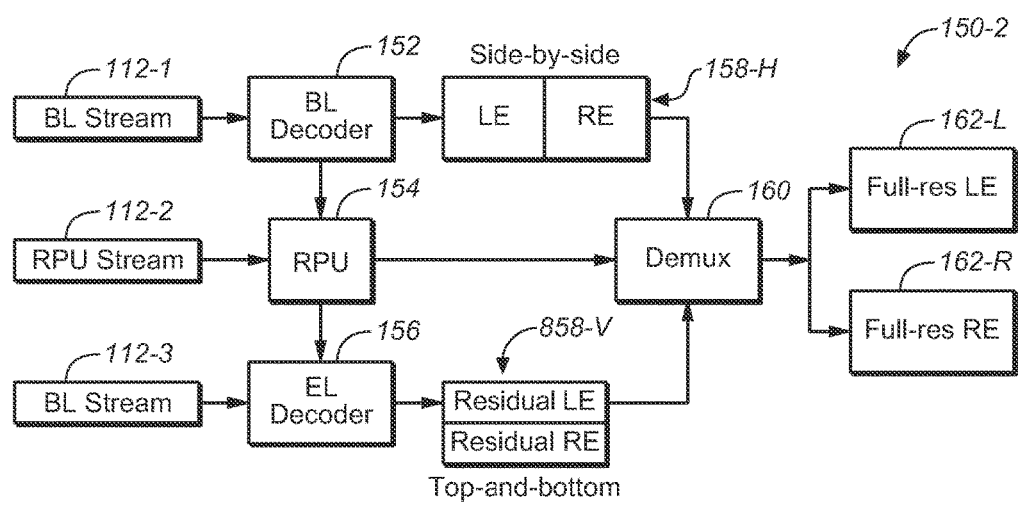
FIG. 8B shows a multi-layer video decoder, in accordance with an embodiment.

FIG. 8A illustrates a multi-layer video encoder (100-1) that maintains high spatial frequency content present in input video sequence, in accordance with an embodiment of the invention. FIG. 8B shows a multi-layer video decoder (150-2) corresponding to the multi-layer video encoder (100-1) shown in FIG. 8A, in accordance with the example embodiment.

In an example embodiment, the multiple-layer video encoder (100-1) is configured to encode an input 3D video sequence that consists of a sequence of 3D input images. A 3D input image in the sequence of 3D images comprises full resolution 3D image data that contains high spatial frequency content. The full resolution 3D image data in a 3D input image may be initially decoded by the multiple-layer video encoder (100) into an input LE image frame (102-L) and an input RE image frame (102-R) both of which contain high spatial frequency content.

In an example embodiment, a first filtering and subsampling mechanism (e.g., 104-H) in the multi-layer video encoder (100) generates LE and RE image data filtered in one of the vertical or horizontal directions but unfiltered in the other of the vertical or horizontal directions based on the input LE and RE image frames (102-L and 102-R). For the purpose of illustration, the first filtering and subsampling mechanism may be 104-H of FIG. 8A configured to filter high spatial frequency content in the horizontal direction from the input LE and RE image frames (102-L and 102-R) and horizontally subsample the LE and RE image frames (102-L and 102-R) as filtered in the horizontal direction into corresponding LE and RE portions. A multiplexer (106-H) may be configured to combine the LE and RE portions in a 3D multiplexed image frame (108-H) in a side-by-side format.

In some embodiments, instead of processing the LE and RE image frames (102-L and 102-R) through an EL processing sub-path comprising filtering, subsampling, multiplexing and compressing into an EL video signal, LE and RE residual image frames (806-L and 806-R) may be processed by the EL processing sub-path. As illustrated in FIG. 8A, an RPU (114) may be configured to generate LE and RE reference image portions based on the multiplexed 3D image frame (108-H) as provided by the BL encoder (110). The LE and RE reference image portions from the RPU (114) may be up-sampled in the same direction as the subsampling direction of the BL processing sub-path. For example, if the BL processing sub-path comprising horizontal filtering, horizontal subsampling, side-by-side multiplexing and BL encoding performs subsampling of the input LE and RE image frames (102-L and 102-R) in the horizontal direction, each of the LE and RE reference image portions generated by the RPU (114) may be up-sampled in the horizontal direction to form an up-sampled LE image frame (804-L) and an up-sampled RE image frame (804-R).

An addition operation (810-L) may be configured to accept the complement of the up-sampled LE image frame 804-L (which has been removed high spatial frequency content in the horizontal direction by the BL processing sub-path) and the input LE image frame (102-L) as input and to add the input LE image frame (102-L) and the complement of the up-sampled LE image frame 804-L to generate an LE residual image frame (806-L) that comprises high spatial frequency content in the horizontal direction only. An addition operation (810-R) may be configured to accept the complement of the up-sampled RE image frame 804-R (which has been removed high spatial frequency content in the horizontal direction by the BL processing sub-path) and the input RE image frame (102-R) as input and to add the input RE image frame (102-R) and the complement of the up-sampled RE image frame 804-R to generate an RE residual image frame (806-R) that comprises high spatial frequency content in the horizontal direction only.

A second filtering and subsampling mechanism may be 104-V of FIG. 8A configured to vertically subsample the LE and RE residual image frames (806-L and 806-R) into corresponding LE and RE residual portions. Additionally and optionally, the second filtering and subsampling mechanism may comprise a vertical filter configured to vertically filter the LE and RE residual image frames (806-L and 806-R), for example, before the above-mentioned subsampling operation on the LE and RE residual image frames (806-L and 806-R). A multiplexer (106-V) may be configured to combine the LE and RE residual portions in a 3D multiplexed image frame (808-V) in a top-and-bottom format.

In an example embodiment, the BL encoder (110) generates, based at least in part on the first multiplexed 3D image frame (e.g., 108-H), a base layer video signal to be carried in a base layer frame compatible video stream (BL FC video stream 112-1), while the EL encoder (116) generates, based at least in part on the second multiplexed 3D image frame (e.g., 808-V), an enhancement layer video signal to be carried in an enhancement layer frame compatible video stream (EL FC video stream 112-3). One or both of the BL encoder (110) and the EL encoder (116) may be implemented using one or more of a plurality of codecs, such as H.264/AVC, VP8, VC-1, and/or others.

FIG. 8B shows a multi-layer video decoder (150-2) that receives input video signals in which high spatial frequency content from an original video sequence (which may be the input video sequence as discussed in connection with FIG. 8A) in two orthogonal directions has been preserved in complementary image data carried in the enhancement layer and in the base layer, respectively, in accordance with an embodiment.

In an example embodiment, the multi-layer video decoder (150-2) is configured to decode one or more input video signals in the BL FC video stream (112-1 of FIG. 8B), EL RPU stream (112-2 of FIG. 8B), and EL FC video stream (112-3 of FIG. 8B) into a sequence of 3D output images. A 3D output image in the sequence of 3D output images as decoded by the multi-layer video decoder (150-2) comprises high spatial frequency content for both eyes, as high spatial frequency content in the original video sequence that gives rise to the input video signals has been preserved in both the horizontal and vertical directions.

In an example embodiment, a BL decoder (152) generates, based at least in part on a BL video signal received from BL FC video stream (112-1 of FIG. 8B), a first multiplexed 3D image frame (158-H), while an EL decoder (156) generates, based at least in part on an EL video signal received from EL FC video stream (112-3 of FIG. 8B), a second multiplexed 3D image frame (858-V). One or both of the BL decoder (152) and the EL decoder (156) may be implemented using one or more of a plurality of codecs, such as H.264/AVC, VP8, VC-1, and/or others.

In some embodiments, the EL decoder (156) generates, based at least in part on the EL video signal in EL FC video stream (112-3 of FIG. 8B) without a prediction reference image frame from the RPU (154), the second multiplexed 3D image frame (858-V).

The multi-layer video decoder (150-2) may combine residual image data received in one or more enhancement layers (e.g., EL FC video stream 112-3) with image data received in a base layer (e.g., BL FC video stream 112-1) to produce full resolution LE and RE output image frames (e.g., 162-L and 162-R) that comprise high spatial frequency content in both vertical and horizontal directions. For example, a demultiplexer (DeMux, 160) may be configured to de-multiplex the multiplexed 3D image frames (158-H and 858-V) into LE and RE output image frames (162-L and 162-R) with high spatial frequency content. While the multiplexed 3D image frames (158-H and 858-V) each comprise image data for both left and right eyes, each of the LE and RE output image frames (162-L and 162-R) is only for one of left and right eyes. A first LE image data portion in the first multiplexed 3D image frame (158-H) may be combined with a second LE image data portion in the second multiplexed 3D image frame (158-V) to form the LE output image (162-L) that comprises high spatial frequency content in both vertical and horizontal directions. Similarly, a first RE image data portion in the first multiplexed 3D image frame (158-H) may be combined with a second RE image data portion in the second multiplexed 3D image frame (158-V) to form the RE output image (162-R) that comprises high spatial frequency content in both vertical and horizontal directions.

The full resolution LE and RE output image frames (162-L and 162-R) both of which comprise high spatial frequency content in both vertical and horizontal directions may be rendered by a display device (which, for example, may comprise the multi-layer video decoder 150) to present a full resolution output 3D image. Rendering the full resolution LE and RE output image frames may, but is not limited to, be in a frame-sequential manner. Because high spatial frequency content has been preserved in the video signals as received by the multi-layer video decoder (150), the full resolution output 3D image contains high spatial frequency image details that may exist in an original 3D image (which may be one of the 3D input images of FIG. 8A).

Figure 9:
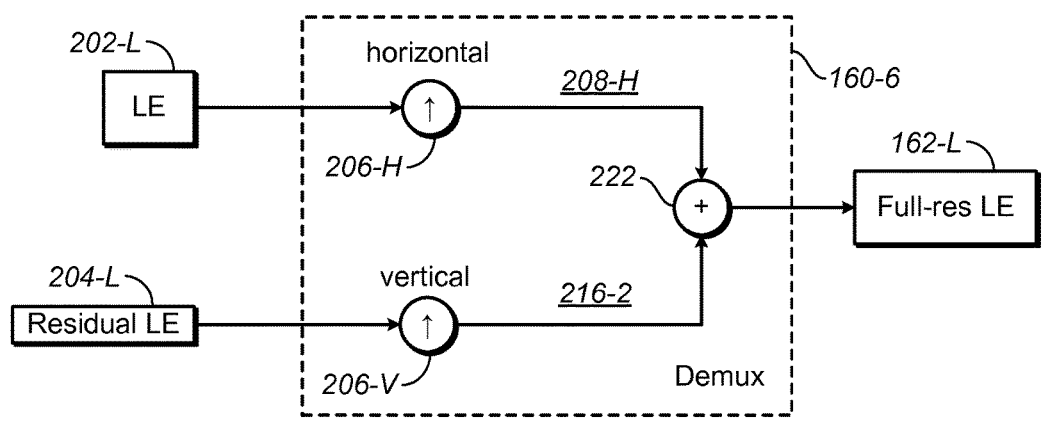
FIG. 9 illustrates a demultiplexer, according to some example embodiments.

In embodiments illustrated in FIG. 8A and FIG. 8B, inter-layer prediction is not required. Decoding of BL and EL image data by a multi-layer video decoder in these embodiments may be independently performed to a greater extent than that in other embodiments (e.g., as illustrated in FIG. 1A and FIG. As a result, a simpler demultiplexer (e.g., 160-6 of FIG. 9) than those illustrated in FIG. 2 through FIG. 4 may be used in a multi-layer video decoder such as 150-2 of FIG. 8B.

It should be noted that residual image data may be subsampled using any of subsampling formats as illustrated in FIG. 5 in progressive video applications, and any of subsampling formats as illustrated in FIG. 7 in interlaced video applications. An RPU signal as described herein may be used to signal, to a downstream video decoder, selected subsampling formats of BL and EL image data as encoded by an upstream multi-layer video encoder.

7. EXAMPLE PROCESS FLOWS

Figure 10A:
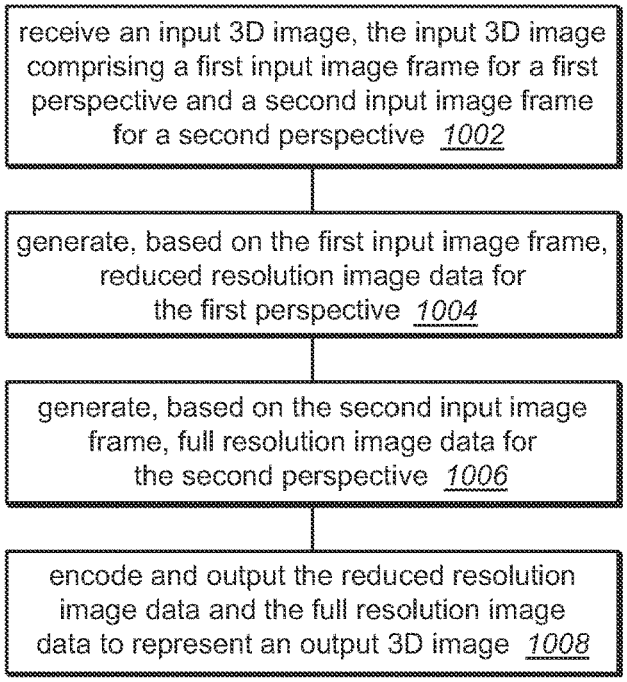
FIG. 10A and FIG. 10B illustrate process flows, in some example embodiments.

FIG. 10A illustrates an example process flow according to an embodiment of the present invention. In some example embodiments, one or more computing devices or hardware components may perform this process flow. In block 1002, a multi-layer video encoder (e.g., 100) receives an input 3D image, the input 3D image comprising a left eye (LE) input image frame and a right eye (RE) input image frame.

In block 1004, the multi-layer video encoder (100) generates, based on the LE input image frame and the RE input image frame, a first multiplexed image frame comprising first high spatial frequency content in a horizontal direction and first reduced resolution content in a vertical direction.

In block 1006, the multi-layer video encoder (100) generates, based on the LE input image frame and the RE input image frame, a second multiplexed image frame comprising second high spatial frequency content in the vertical direction and second reduced resolution content in the horizontal direction.

In block 1008, the multi-layer video encoder (100) encodes and outputs the first multiplexed image frame and the second multiplexed image frame to represent the input 3D image.

In an embodiment, the 3D input image is a first 3D input image in a sequence of 3D input images comprising a second different 3D input image having a second LE input image frame and a second LE input image frame. The multi-layer video encoder (100) is further configured to perform: generating, based on the second LE input image frame and the second RE input image frame, a third multiplexed image frame comprising third high spatial frequency content in the horizontal direction and third reduced resolution content in the vertical direction; generating, based on the second LE input image frame and the second input image frame, a fourth multiplexed image frame comprising fourth high spatial frequency content in the vertical direction and fourth reduced resolution content in the horizontal direction; and encoding and outputting the third multiplexed image frame and the fourth multiplexed image frame to represent the second input 3D image.

In an embodiment, the first multiplexed image frame comprises a first LE image data portion and a first RE image data portion. The first LE image data portion and the first RE image data portion are of a same spatial resolution along both horizontal and vertical directions. The second multiplexed image frame comprises a second LE image data portion and a second RE image data portion. The second LE image data portion and the second RE image data portion are of a same spatial resolution along both horizontal and vertical directions. In an embodiment, each of the first LE image data portion and the first RE image data portion represents a subsampled version (e.g., one half, less than one half, or another reduced number, of the full resolution) of a whole image frame; the first multiplexed image frame adopts a side-by-side format to carry the first LE image data portion and the first RE image data portion. Each of the second LE image data portion and the second RE image data portion represents a subsampled version (e.g., one half, less than one half, or another reduced number, of the full resolution) of a whole image frame; the second multiplexed image frame adopts a top-and-bottom format to carry the second LE image data portion and the second RE image data portion.

In an embodiment, the first multiplexed image frame adopts a first multiplexing format that preserves the high spatial frequency content in the horizontal direction. The second multiplexed image frame adopts a second multiplexing format that preserves the high spatial frequency content in the vertical direction.

In an embodiment, one of the first multiplexed image frame or the second multiplexed image frame is outputted in a base layer bitstream in a plurality of bit streams, while the other of the first multiplexed image frame or the second multiplexed image frame is outputted in an enhancement layer bitstream in the plurality of bit streams.

In an embodiment, the multi-layer video encoder (100) is further configured to perform: generating, based at least in part on the first multiplexed image frame, prediction reference image data; and encoding an enhancement layer video signal based on differences between the prediction reference image data and the second input image frame.

In an embodiment, the multi-layer video encoder (100) is further configured to perform: applying one or more first operations comprising at least one of (a) spatial frequency filtering operations or (b) spatial subsampling operations in the second direction to the first input image frame and the second input image frame in generating the first multiplexed image frame, wherein the one or more first operations removes high spatial frequency content in the second direction and preserves high spatial frequency content in the first direction; and applying one or more second operations comprising at least one of (a) spatial frequency filtering operations or (b) spatial subsampling operations in the first direction to the first input image frame and the second input image frame in generating the second multiplexed image frame, wherein the one or more second operations removes high spatial frequency content in the first direction and preserves high spatial frequency content in the first direction.

In an embodiment, one of first multiplexed image frame or the second multiplexed image frame comprises residual image data generated by subtracting reference image data generated based on the other of the first multiplexed image frame or the second multiplexed image frame from input image data derived from the LE input image frame and the RE input image frame.

In an embodiment, the multi-layer video encoder (100) is further configured to convert one or more 3D input images represented, received, transmitted, or stored with one or more input video signals into one or more 3D output images represented, received, transmitted, or stored with one or more output video signals.

In an embodiment, the input 3D image comprises image data encoded in one of a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space associated with the BT.709 Recommendation standard of the International Telecommunications Union (ITU), etc.

Figure 10B:
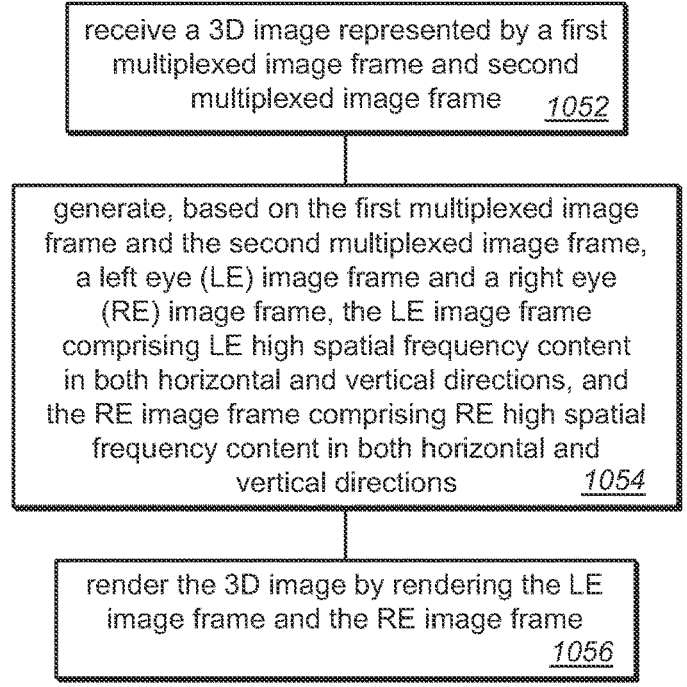

FIG. 10B illustrates another example process flow according to an example embodiment of the present invention. In some example embodiments, one or more computing devices may perform this process flow. In block 1052, a multi-layer video decoder (e.g., 150) receives a 3D image represented by a first multiplexed image frame and second multiplexed image frame, the first multiplexed image frame comprising first high spatial frequency content in a horizontal direction and first reduced resolution content in a vertical direction, and the second multiplexed image frame comprising second high spatial frequency content in the vertical direction and second reduced resolution content in the horizontal direction.

In block 1054, the multi-layer video decoder (150) generates, based on the first multiplexed image frame and the second multiplexed image frame, a left eye (LE) image frame and a right eye (RE) image frame, the LE image frame comprising LE high spatial frequency content in both horizontal and vertical directions, and the RE image frame comprising RE high spatial frequency content in both horizontal and vertical directions.

In block 1056, the multi-layer video decoder (150) renders the 3D image by rendering the LE image frame and the RE image frame.

In an embodiment, the 3D image is a first 3D image in a sequence of 3D images comprising a second different 3D image having third multiplexed image frame and a fourth multiplexed image frame, the third multiplexed image frame comprising third high spatial frequency content in the horizontal direction and third reduced resolution content in the vertical direction, and the fourth multiplexed image frame comprising fourth high spatial frequency content in the vertical direction and fourth reduced resolution content in the horizontal direction. In an embodiment, the multi-layer video decoder (150) is further configured to perform: generating a second LE image frame and a second RE image frame, the second LE image frame comprising high spatial frequency content in both horizontal and vertical directions, and the second LE image frame comprising high spatial frequency content in both horizontal and vertical directions; and rendering the second 3D image by rendering the second LE image frame and the second RE image frame.

In an embodiment, at least one of the first multiplexed image frame or the second multiplexed image frame comprises an LE image data portion and an RE image data portion. The LE image data portion and the RE image data portion are of a same spatial resolution. In an embodiment, each of the LE image data portion and the RE image data portion represents a subsampled version (e.g., one half, less than one half, or another reduced number, of the full resolution) of a whole image frame. The LE image data portion and the RE image data portion forms a single image frame in one of a side-by-side format or a top-and-bottom format.

In an embodiment, one of the first multiplexed image frame or the second multiplexed image frame is decoded from a base layer bitstream in a plurality of bit streams, while the other of the first multiplexed image frame or the second multiplexed image frame is decoded from an enhancement layer bitstream in the plurality of bit streams.

In an embodiment, the multi-layer video decoder (150) is further configured to perform: generating, based at least in part on one of the first multiplexed image frame or the second multiplexed image frame, prediction reference image data; and generating, based on enhancement layer (EL) data decoded from an EL video signal and the prediction reference image data, one of the LE image frame or the RE image frame.

In an embodiment, the multi-layer video decoder (150) is further configured to perform: applying one or more first operations comprising at least one of (a) spatial frequency filtering operations or (b) demultiplexing operations in generating the LE image frame, wherein the one or more first operations combine LE high spatial frequency content, as derived from the first multiplexed image frame and the second multiplexed image frame, of both horizontal and vertical directions into the LE image frame; and applying one or more second operations comprising at least one of (a) spatial frequency filtering operations or (b) demultiplexing operations in generating the RE image frame, wherein the one or more second operations combine RE high spatial frequency content, as derived from the first multiplexed image frame and the second multiplexed image frame, of both horizontal and vertical directions into the RE image frame.

In an embodiment, the one or more first operations and the one or more second operations comprise at least a high pass filtering operation.

In an embodiment, the one or more first operations and the one or more second operations comprise a processing sub-path that replaces at least one high pass filtering operation. The processing sub-path comprises at least one subtraction operation and no high pass filtering operation.

In an embodiment, one of the first multiplexed image frame or the second multiplexed image frame comprises residual image data. The multi-layer video decoder (150) is further configured to perform: decoding and processing enhancement layer image data without generating prediction reference data from the other of the first multiplexed image frame or the second multiplexed image frame.

In an embodiment, the multi-layer video decoder (150) is further configured to process one or more 3D images represented, received, transmitted, or stored with one or more input video signals.

In an embodiment, the 3D image comprises image data encoded in one of a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space associated with the BT.709 Recommendation standard of the International Telecommunications Union (ITU), etc.

In various example embodiments, an encoder, a decoder, a system, etc., performs any or a part of the foregoing methods as described.

8. RESIDUAL IMAGE CODING WITH CARRIER SIGNAL

Figure 12A:
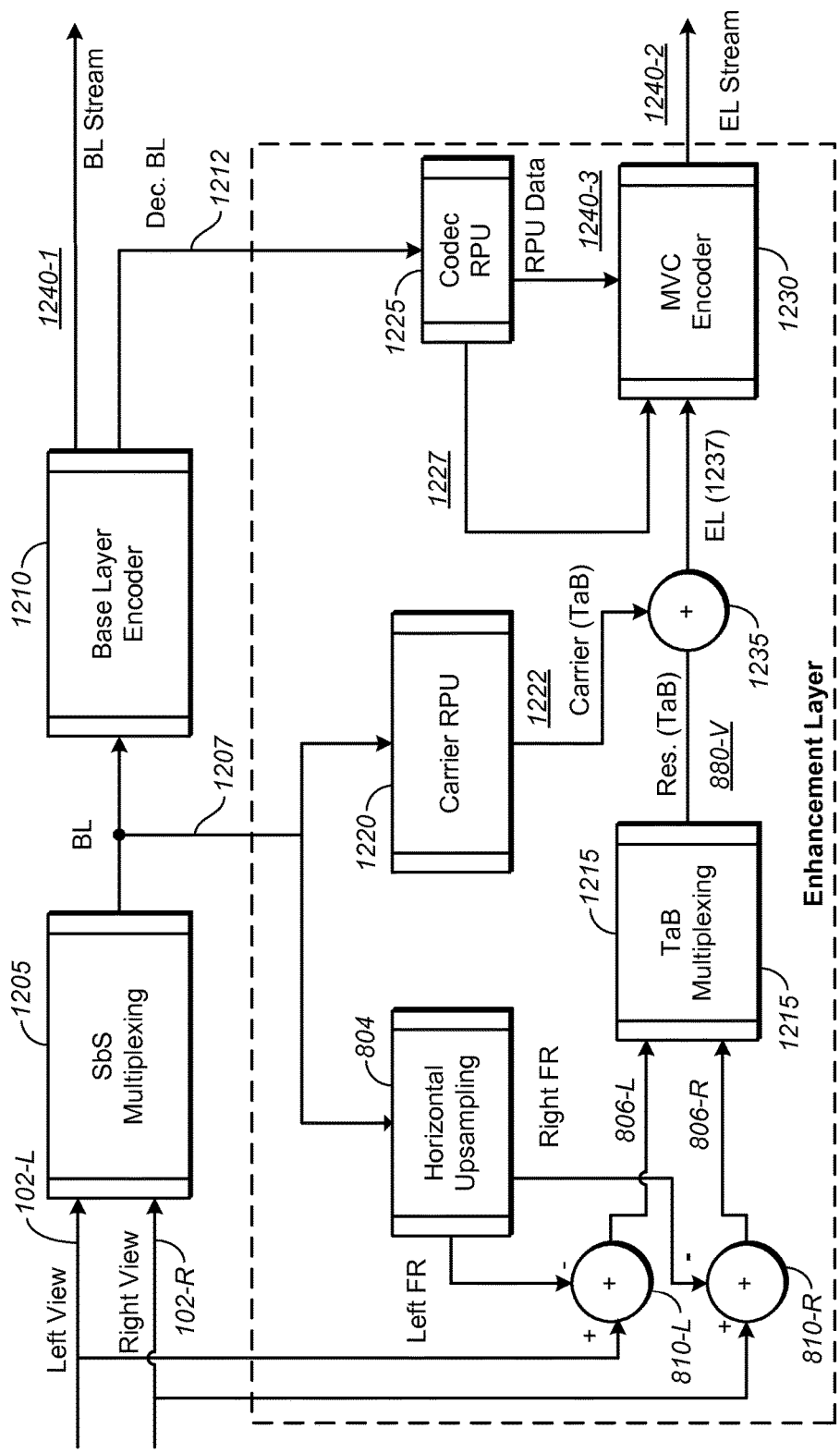
FIG. 12A and FIG. 12B illustrate an FCFR multi-layer video encoder and an FCFR multi-layer video decoder, in accordance with an embodiment of the invention.

As depicted in FIG. 8A, in one embodiment, the enhancement layer (EL) stream 112-3 comprises image residuals (e.g., 806-L and 806-R) multiplexed as top-and-bottom (TaB) frames (808-V). Instead of coding these residual signal directly (e.g., by using EL encoder 116), improved compression may be achieved by combining the residual signal with a "carrier" image signal to form a new EL signal. The purpose of using such a carrier signal is to make the enhancement layer look more like a natural video signal for which existing video codecs, such as the H.264/AVC codec, as described in "ISO/IEC 14496-10: Information technology—coding of audio-visual objects—Part 10: Advanced Video Coding", are optimized. An example of such an embodiment is depicted in FIG. 12A. FIG. 12A illustrates an example FCFR encoder according to an embodiment that utilizes a carrier image signal in the enhancement layer. As depicted in FIG. 12A, the processing of the base layer follows the processing steps discussed earlier, e.g., as depicted in FIG. 8A. Left view (102-L) and right view (102-R) signals are down-sampled and multiplexed in step 1205 to generate a multiplexed half-resolution frame, e.g., in the side-by-side (SbS) format. Step 1205 represents a simplified representation of steps 104-H and 106-H depicted in FIG. 8A. After multiplexing, BL signal 1207 is then compressed with a base layer encoder 1210 (e.g., an H.264/AVC encoder) to generate compressed BL stream 1240-1.

BL signal 1207 (or alternatively, decoded BL signal 1212) may be used to regenerate full resolution (FR) versions of the left and right views (Left FR and Right FR) using horizontal up-sampling 804. The original (102-L and 102-R) and the reconstructed views are then subtracted (e.g., in 810) to generate residuals 806-L and 806-R. Multiplexer 1215, multiplexes these residuals in a frame format (e.g., TaB) that is orthogonal to the frame format being used in the base layer (e.g., SbS) to generate residual signal 808-V. Next, residual 808-V is added to a carrier signal 1222 to generate an EL signal 1237. Carrier signal 1222 may be generated using a Carrier RPU 1220 in response to the SbS BL 1207 signal. Carrier RPU may perform both horizontal up-sampling and vertical down-sampling to generate a carrier TaB signal 1222 that matches the format and resolution of the residual signal (e.g., 808V). In an embodiment (see FIG. 15), vertical down-sampling is performed before the horizontal up-sampling. In another embodiment, the carrier signal may be generated in response to a decoded version of the BL stream, e.g., decoded BL signal 1212. In another embodiment, similar processing may be applied when the base layer is in the TaB format and the enhancement layer is in the SbS format (see FIG. 14). Processing related to the Carrier RPU 1220 and the Codec RPU 1225 may be performed by the same processor or different processors.

To maintain the integrity of the original residual (808-V), in an embodiment, the range of the carrier signal may be reduced, e.g., by dividing each pixel by a constant, e.g., 2. Such a division process may be combined with the filtering process in the carrier RPU. In another embodiment, when the residual 808-V is very small, the carrier signal may have a fixed pixel value for all of its pixels, e.g., 128. In another embodiment, the value of the carrier signal may be defined adaptively based on the properties of the residual signal. Such decisions may be signaled to the decoder using metadata (e.g., as part of an RPU data stream).

In one embodiment, EL signal 1237 is compressed using multi-view coding (MVC) as specified in the H.264 (AVC) specification to generate a coded or compressed EL stream 1240-2. Since BL signal 1207 and EL signal 1237 do not have the same multiplexed format, a Reference Processing Unit (RPU) 1225 may be employed to convert the decoded SbS BL signal 1212 into a TaB signal (1227) that can be used as a reference by the MVC encoder 1230. This TaB picture (1227) is a newly generated inter-view prediction reference picture and is inserted into the reference picture list for encoding an EL picture. To further improve coding efficiency, Codec RPU 1225 may apply additional partitioning, processing and filtering to match an inter-view reference picture from the BL signal to the EL input signal, as described in PCT application PCT/US2010/040545, filed Jun. 30, 2010, by A. Tourapis, et al., and incorporated herein by reference in its entirety. The choices of filters and partitions being used in the RPUs can be adapted at multiple levels of resolution, e.g., at the slice, picture, Group of Picture (GOP), scene, or sequence level. On an encoder, the coded EL and BL streams (1240) may be multiplexed with RPU data (e.g., 1240-3) and other auxiliary data (not shown) to be transmitted to a decoder.

Figure 12B:
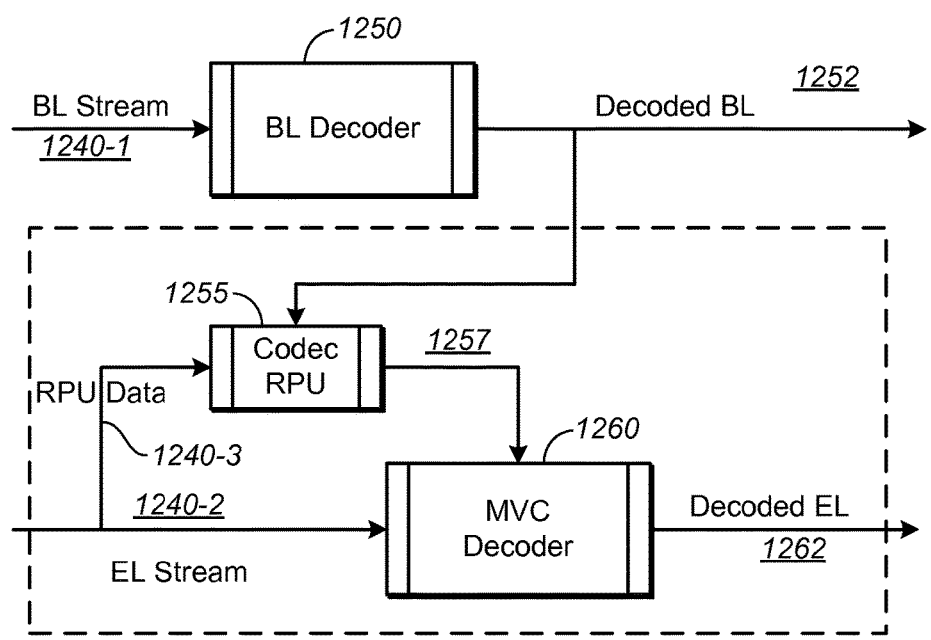

FIG. 12B illustrates a decoding example process flow according to an example embodiment of the present invention. At the receiver, the incoming stream is demultiplexed to generate a coded BL stream (1240-1), a coded EL stream (1240-2), and RPU Data (e.g., 1240-3). BL Decoder 1250 corresponds to the BL encoder 1210. In one embodiment BL decoder 1250 is an AVC decoder. BL decoder 1250 will generate a decoded (e.g., SbS) BL image 1252.

Since the coded EL stream 1240-2 was coded by using reference frames from both the EL signal 1237 and the decoded BL signal 1212, the same process is matched on the decoder as well. Using RPU data 1240-3, the codec RPU 1255 may generate signal 1257 to be used by MVC decoder 1260. Signal 1257 comprises a predicted enhancement layer signal which may be used as an additional sequence of reference frames for the MVC decoder 1260 to generate a decoded EL signal 1262.

Figure 13A:
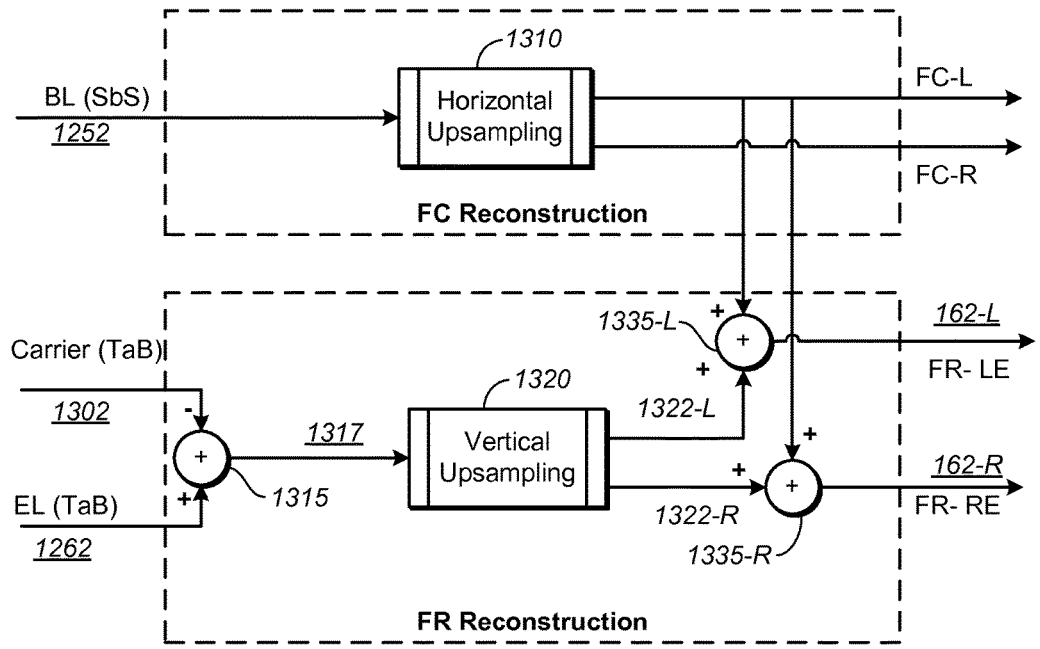
FIG. 13A and FIG. 13B illustrate example embodiments for reconstructing the full resolution signals.
Figure 15:
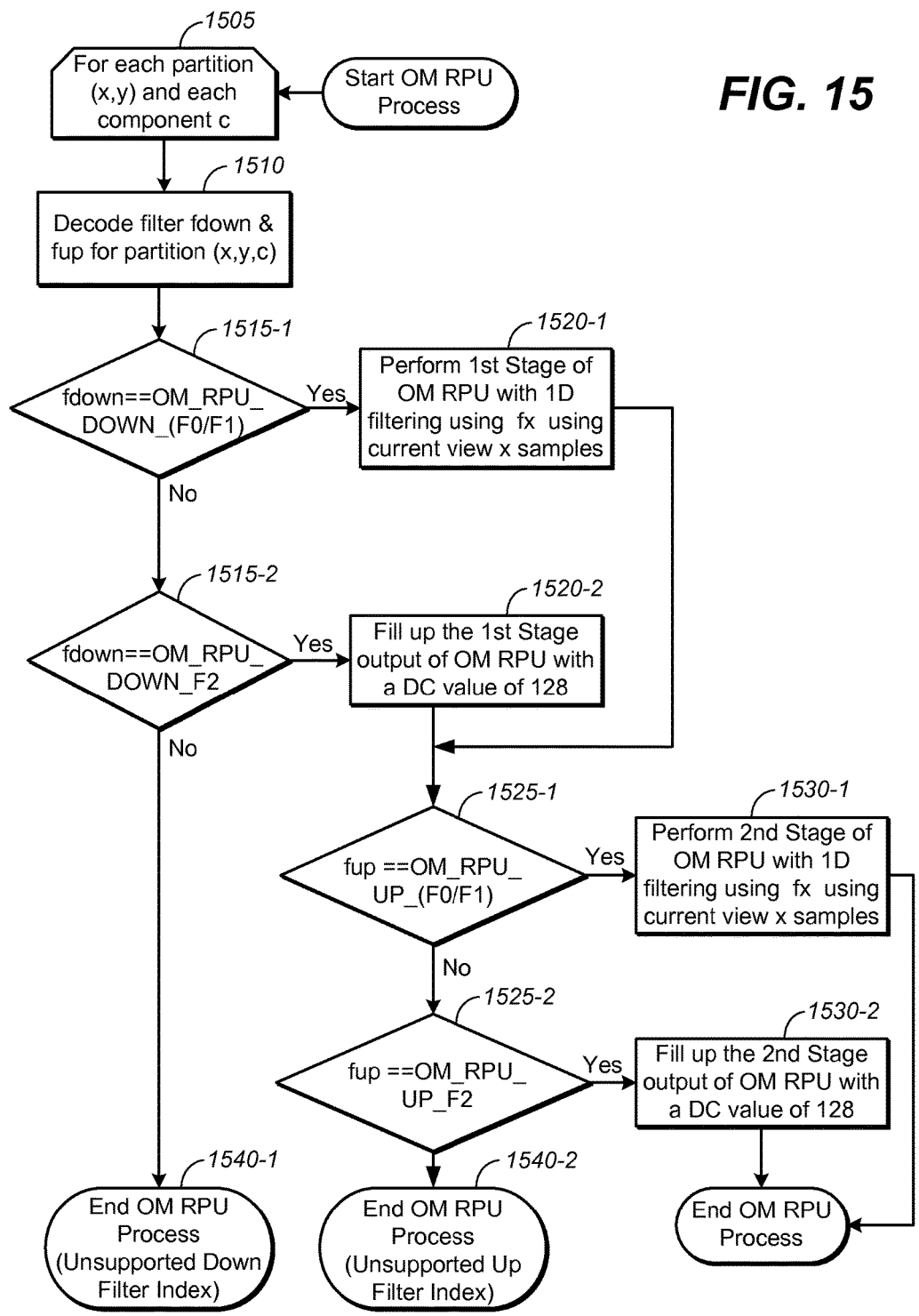
FIG. 15 illustrates a filtering process flow in the decoder RPU to generate a carrier image signal according to an embodiment of the invention.

After decompressing the BL and EL streams, the decoder needs to reconstruct the left and right views at full resolution. One example embodiment of such a method, to be referred to as "the difference" method, is depicted in FIG. 13A. The vertical or horizontal frequencies that are missing in the base layer can be constructed as a pixel-wise difference of the enhancement layer (1262) and the carrier signal 1302. Carrier signal 1302 can be reconstructed using decoded BL signal 1252 and the decoder RPU (e.g., 1255) using processing that matches the processing of the encoder Carrier RPU (1220). An example of such a process is depicted in FIG. 15. Residue signal 1317 is then up-sampled (e.g., in 1320) and merged by pixel-wise addition with the up-sampled frame-compatible (FC) reconstructed base layer (FC-L and FC-R) to reconstruct the full resolution (FR) left and right views (FR-LE and FR-RE). In one embodiment, to reduce complexity, one may reuse the output from codec RPU 1255 because the codec RPU and carrier RPU tend to share the same filters. In the case when one partition and one filter are employed in the codec RPU, the two RPUs apply exactly the same processing.

As depicted in FIG. 13A, legacy receivers may still decode a pair of half-resolution, frame-compatible, views (FC-L and FC-R), by performing the proper up-sampling on the BL signal 1252.

Figure 13B:
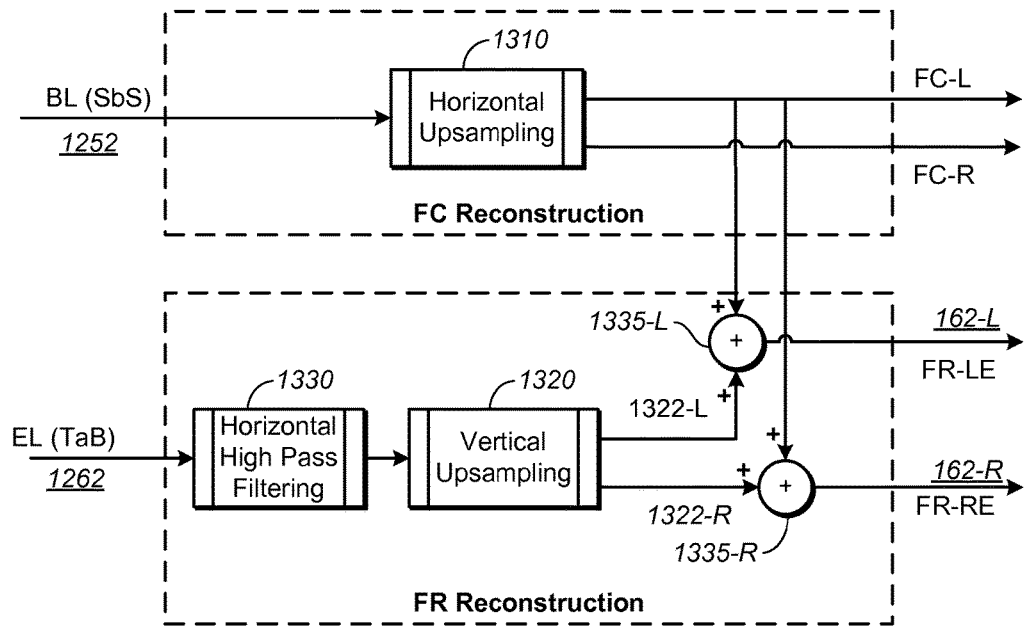

FIG. 13B depicts another example embodiment for reconstructing the full resolution signal, the method to be referred to as "the high pass method." Under this method, the decoded TaB EL signal 1262 is first processed by a horizontal high-pass filter 1330. Such a filter removes the low-frequency components of the carrier signal in the EL signal, thus generating a carrier-free residual signal (e.g., 808-V). The output of the high-pass filter is up-sampled vertically (1320) to generate residual signals 1322-L and 1322-R, which are added to the horizontally up-sampled, reconstructed frame-compatible layer (FC-L and FC-R), to generate full-resolution estimates of the original views (e.g., FR-RE and FR-LE).

If the source video is interlaced, in an embodiment, the top field and bottom field are processed independently during the vertical filtering (e.g., down-sampling or up-sampling). Then the fields are merged (e.g., by line interleaving) to create a frame. If an AVC encoder is being used, then the interlaced signal can be coded either in frame coding mode or field coding mode. The codec RPU should also be instructed whether to process an inter-view reference picture from BL as a frame or fields. In AVC coding, there is no indication of the scan type of a coded sequence in the mandated bitstream, since it is out of the scope of decoding. There might be some information presented in the Supplemental Enhancement Information (SEI) message, but a SEI message is not required for decoding. In one embodiment, a high level syntax is proposed to indicate if the RPU should apply frame or field processing. In one embodiment, if it is an interlaced signal, no matter how a picture is coded, the RPU may always process the picture as separate fields. In another embodiment, the RPU may follow how the BL signal is coded. Hence, if the BL signal is coded as fields, the RPU applies field processing, otherwise it applies frame processing.

Embodiments of this invention comprise a variety of filters, which can be categorized as: multiplexing (or muxing) filters, RPU filters, and de-multiplexing (or de-muxing) filters. When designing muxing filters, the goal is to maintain as much information as possible from the original filter, but without causing aliasing. For down-sampling, a muxing filter may be designed to have very flat passband response and strong attenuation at the midpoint of the spectrum, where the signal is folded during down-sampling, to avoid aliasing. In an embodiment, (in Matlab notation) an example of such a filter has coefficients:

$[30, -4, -61, -21, 83, 71, -102, -178, 116, 638, 904, 638, 116, -178, -102, 71, 83, -21, -61, -4, 30]./2^{11}$

When designing the RPU, the down-sampling filter and up-sampling filters should have a very low cutoff frequency, as the high frequencies in carrier image are not used for reconstruction and having such low passed signal would help to increase coding efficiency for the EL signal. The RPU down-sampling and up-sampling filters should also be of as low order as possible since these exact filters are used in decoders for real time decoding. Examples of such filters are depicted in Table 7.

During decoding, one may apply as a de-muxing filter the same filter as the up-sampling filter used in the codec RPU. For the high pass method of reconstruction (e.g., FIG. 13B), the high-pass filter (1330) should be complementary of the combined frequency responses of the muxing down-sampling filter and de-muxing up-sampling filter. Typically the order of such a filter will be high, which may not be suitable for certain real-time decoder applications. High-pass filters with similar pass band characteristics, but lower stop band attenuation, can also be derived with a much lower filter order, making them better suited for real-time decoder applications. Examples of such filters are depicted in Table 8.

Some implementations may have a very low bit rate requirement for the EL stream. In one embodiment, to improve coding quality at low bitrates, one may remove all chroma information from the EL stream. In one example, one may set chroma values in the EL signal to be a constant value, for example, 128. Correspondingly, the color components of an inter-view reference picture processed by the Codec RPU needs to be set in the same way. In another embodiment, one may select and transmit only those regions of the input signal with the most high frequencies in the EL signal and gray out the remaining areas, for example, by setting them to a constant value (e.g., 128). The location and size of such regions may be signaled from an encoder to the decoder using metadata, e.g., through the RPU data stream.

In FIG. 12A, the residue signal 808-V is added to the carrier signal 1222 directly to generate EL 1237. In another embodiment, linear or non-linear quantization method may be applied to the residue signal before adding it with the carrier.

Example embodiments discussed so far address the problem of restoring missing horizontal or vertical frequencies. In an embodiment, additional enhancement layers may be employed to restore additional frequencies, such as diagonal. For example, the input signal (102-L and 102-R) may be down-sampled across a diagonal direction. That information (or another residual signal based on that diagonal information) may be transmitted to a decoder as a second enhancement layer (EL2). A decoder could merge BL, EL, and EL2 signals to generate an FCFR signal. In another embodiment, instead of using a separate EL2 stream to code diagonal information, one may code luma diagonal information in the chroma channel in the EL signal. In such an implementation, luma will be coded in full resolution, but chroma will be coded in half resolution.

8.2 Syntax Examples 8.3 A coding standard, such as H.264, typically defines only the syntax of the coded bitstream and the decoding process. This section presents examples of a proposed syntax for a new FCFR profile in H.264 or other compression standard that supports the methods of this invention.

The first part is called the RPU header, rpu_header( ), and includes the static information that most likely is not going to change during the transmission of the signal.

The second part is called the RPU data payload, rpu_data_payload( ), and includes the dynamic information which might be updated more frequently. The RPU data payload signals to the decoder the filters that will be used to update the inter-view reference pictures prior to their use for prediction.

The syntax can be sent at the slice level, the picture level, the GOP level, the scene level, or at the sequence level. It can be included at the NAL unit header, the Sequence Parameter Set (SPS) and its extension, the SubSPS, the Picture Parameter Set (PPS), the slicer header, the SEI message, or a new NAL unit, and the like. In an example embodiment, the RPU syntax is only updated at the sequence level. For backwards compatibility, as shown in Table 1, a new NAL unit for Coded slice extension for MFC, slice_layer_extension_rbsp( ) is also defined. In our example, a new profile, denoted in Table 2 as profile 134, is assigned for an embodiment of a FCFR 3D system using orthogonal multiplexing (OM).

Additional examples of the proposed syntax are depicted in Table 2, Table 3 and Table 4, where proposed additions to the existing H.264/AVC specification are depicted in Courier font. In this example, the proposed RPU syntax is invoked at the sequence level and it is added in the sequence parameter set MVC extension.

RPU Data Header Semantics rpu_type specifies the prediction type purpose for the RPU signal. If not present, then its value is assumed to be 0.

rpu_format specifies the prediction process format, given the rpu_type, that will be used when processing the video data for prediction and/or final reconstruction. If not present, then its value is assumed to be 0. Table 5 depicts examples of rpu_type and rpu_format values.

default_grid_position signals whether view0 and view1 grid position information should be explicitly signaled. If default_grid_position is set to 1, or not present, then default values are obtained as follows:

```
if (rpu_type == 0 && rpu_format == 0 ) {
        view0_grid_position_x = 4;
        view0_grid_position_y = 8;
        view1_grid_position_x = 12;
        view1_grid_position_y = 8;
}
else if (rpu_type == 0 && rpu_format == 1)
{
        view0_grid_position_x = 8;
        view0_grid_position_y = 4;
        view1_grid_position_x = 8;
        view1_grid_position_y = 12;
}
``` view0_grid_position_x is same as the frame0_grid_position_x as defined in Frame packing arrangement SEI message semantics section in the H.264 specification.
view0_grid_position_y is same as the frame0_grid_position_y as defined in Frame packing arrangement SEI message semantics section in the H.264 specification.
view1_grid_position_x is same as the frame1_grid_position_x as defined in Frame packing arrangement SEI message semantics section in the H.264 specification.
view1_grid_position_y is same as the frame1_grid_position_y as defined in Frame packing arrangement SEI message semantics section in the H.264 specification.
interlace_processing_flag signals whether reference processing will be applied on a frame or a field basis. If it is set to zero, processing will take place in the frame domain. If this flag is set to 1 then processing shall be performed separately for each field.
disable_part_symmetry_flag (when present) signals whether filter selection for spatially collocated partitions belonging to different views is constrained or unconstrained. When this flag is not set, both collocated partitions in either view are processed with the same RPU filter to derive the enhancement layer prediction. Hence half as many filters are signaled. When this flag is set, a filter is signaled for each partition in the processed picture. If not present, then all partitions use the same filtering method (NULL). This flag is constrained to be equal to 1 if the rpu_format is set to SBS and PicWidthInMbs=1 or if rpu_format is set to OU or TAB and PicHeightInMapUnits is equal to 1. If not present, the value of this flag will be set to 1.
num_x_partitions_minus1 signals the number of partitions that are used to subdivide the processed picture in the horizontal dimension during filtering. It can take any non-negative integer value. If not present, then the value of num_x_partitions_minus1 is set equal to 0. The value of num_x_partitions_minus 1 is between 0 and Clip3(0, 15, (PicWidthInMbs>>1)−1), where PicWidthInMbs is specified in the H.264 specification.
num_y_partitions_minus1 signals the number of partitions that are used to subdivide the processed picture in the vertical dimension during filtering. It can take any non-negative integer value. If not present, then the value of num_y_partitions_minus 1 is set equal to 0. The value of num_y_partitions_minus1 is between 0 and Clip3(0, 7, (PicHeightInMapUnits>>1)−1), where PicHeightInMapUnits is specified in the H.264 specification.

RPU Data Payload Semantics separate_component_filtering_flag signals whether separate filters are transmitted for each color space component or a single filter is used for all components. If this flag is set to zero, one then sets the following for each filter tap coefficient: filter_idx[y][x][1]=filter_idx[y][x][2]=filter_idx[y][x][0].

filter_idx_down[y][x][cmp] contains an index that corresponds to the down-sampling processing filter that is to be used for the partition with vertical coordinate y and horizontal coordinate x, corresponding to color component cmp. This index may take any non-negative value, each corresponding to a unique processing filter or scheme.

filter_idx_up[y][x][cmp] contains an index that corresponds to the up-sampling processing filter that is to be used for the partition with vertical coordinate y and horizontal coordinate x, corresponding to color component cmp. This index may take any non-negative value, each corresponding to a unique processing filter or scheme.

An example of the system providing the filter_idx methods is shown in Table 6. Examples of filters are shown in Table 7. The "F2" filter for down-sampling and up-sampling has no filter coefficients. It simply sets the carrier signal to a constant value (e.g., 128).

Figure 14:
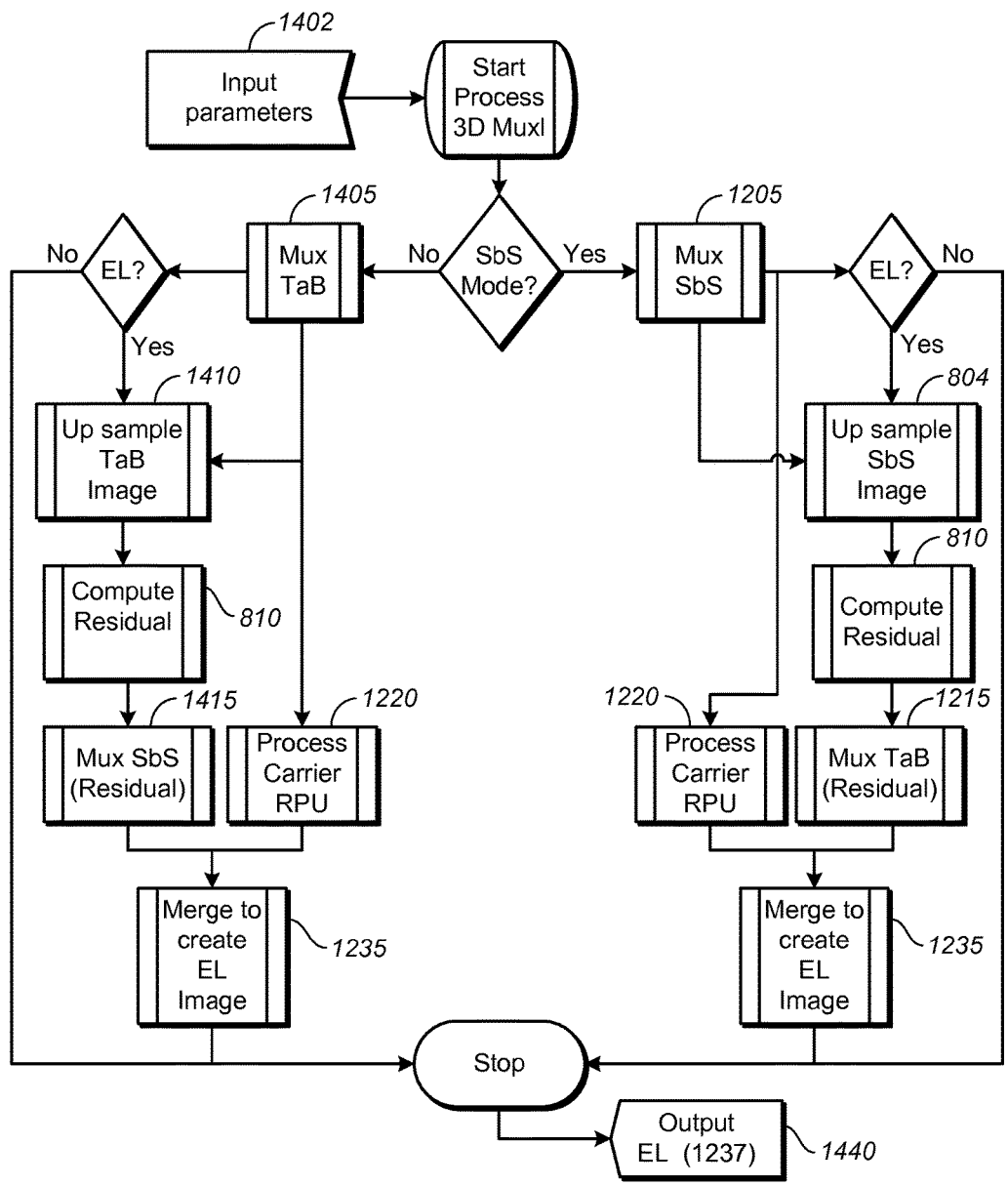
FIG. 14 illustrates an encoding process flow for generating an enhancement layer according to an embodiment of the invention.

FIG. 14 depicts an example process flow for generating the EL signal (1237). The right-half of FIG. 14 depicts the case where the base layer is coded in side-by-side (SbS) format, hence the EL layer is coded in top-and-bottom (TaB) format. The process flow in this half matches the process flow as depicted in FIG. 12A. The left-half of FIG. 14 depicts the case when the base layer is coded in top-and-bottom (TaB) format (1405) and the enhancement layer is coded in SbS format (1415). TaB multiplexing step 1405 may follow the processing depicted in steps 104-V and 106-V in FIG. 1, while SbS multiplexing 1415 may follow the processing depicted in steps 104-H and 106-H in FIG. 1.

Given the syntax described earlier, FIG. 15 depicts an embodiment of an example process in the RPU during the decoding of an FCFR stream to generate carrier signal 1302. A similar process may also be applied to generate the carrier signal 1222 in the encoder, e.g., using Carrier RPU 1220. As depicted in FIG. 15, the process operates on all partitions and all color components of an input sequence. The data flow may be the same regardless whether the BL signal is multiplexed in SbS format or in TaB format; however, the filtering orientations depend on the format of the base layer. The process also assumes that down-sampling precedes up-sampling; however, in another embodiment up-sampling may precede down-sampling.

Using the RPU data stream (e.g., 1240-3), and a filter identification look-up table (e.g., Table 6), in step 1510 the RPU identifies the down-sampling filter to be used to down-sample the decoded BL signal. If it is an F0 or F1 filter (1515-1), then it proceeds to perform down-sampling (1520-1). If it is an F2 filter, then it simply creates a carrier signal with all pixel values set to a constant (e.g., 128) (1520-2). If the BL layer is coded in the SbS format, then down-sampling (1520) is performed in the vertical direction. If the BL layer is coded in the TaB format, then down-sampling (1520) is performed in the horizontal direction.

After down-sampling (1520), the two original halves (or views) are de-multiplexed and then multiplexed again in an orthogonal orientation, e.g., from SbS to TaB or from TaB to SbS, to form an intermediate result that matches the multiplexing format of the residual signal. This intermediate signal is then up-sampled so that the final carrier signal matches the resolution of the residual signal. If the up-sampling filter is F0 or F1 (1525-1), then the intermediate result is up-sampled to generate the final carrier signal 1237. If it is an F2 filter, then it creates a carrier signal with all pixel values set to a fixed value (e.g., 128) (1530-2). If the BL layer is coded in the SbS format, then up-sampling (1530) is performed in the horizontal direction. If the BL layer is coded in the TaB format, then up-sampling (1530) is performed in the vertical direction. If the decoder does not recognize any of the filters, then the process terminates and error messages may be generated (1540).

TABLE 1

NAL Unit type, syntax element categories, and NAL unit type classes

| nal_unit_type | Content of NAL unit and RBSP syntax structure | C | Annex A NAL unit type class | Annex G and Annex H NAL unit type class | Annex I NAL unit type class |
|---|---|---|---|---|---|
| 0 | Unspecified | | non-VCL | non-VCL | non-VCL |
| 1 ... 20 | See Original Table | | VCL | VCL | VCL |
| 22 | Coded slice extension for MFC slice_layer_extension_rbsp( ) | 2, 3, 4 | non-VCL | VCL | VCL |
| 23 | Reserved | | non-VCL | non-VCL | VCL |
| 24 ... 31 | Unspecified | | non-VCL | non-VCL | non-VCL |

TABLE 2

Sequence parameter set MVC extension Syntax

| | C | Descriptor |
|---|---|---|
| seq_parameter_set_mvc_extension( ) { | | |
|   num_views_minus1 | 0 | ue(v) |
|   for( i = 0; i <= num_views_minus1; i++ ) | | |
|     view_id[ i ] | 0 | ue(v) |
|   for( i = 1; i <= num_views_minus1; i++ ) { | | |
|     num_anchor_refs_l0[ i ] | 0 | ue(v) |
|     for( j = 0; j < num_anchor_refs_l0[ i ]; j++ ) | | |
|       anchor_ref_l0[ i ][ j ] | 0 | ue(v) |
|     num_anchor_refs_l1[ i ] | 0 | ue(v) |
|     for( j = 0; j < num_anchor_refs_l1[ i ]; j++ ) | | |
|       anchor_ref_l1[ i ][ j ] | 0 | ue(v) |
|   } | | |
|   for( i = 1; i <= num_views_minus1; i++ ) { | | |
|     num_non_anchor_refs_l0[ i ] | 0 | ue(v) |
|     for( j = 0; j < num_non_anchor_refs_l0[ i ]; j++ ) | | |
|       non_anchor_ref_l0[ i ][ j ] | 0 | ue(v) |
|     num_non_anchor_refs_l1[ i ] | 0 | ue(v) |
|     for( j = 0; j < num_non_anchor_refs_l1[ i ]; j++ ) | | |
|       non_anchor_ref_l1[ i ][ j ] | 0 | ue(v) |
|   } | | |
|   num_level_values_signalled_minus1 | 0 | ue(v) |
|   for( i = 0; i <= num_level_values_signalled_minus1; i++ ) { | | |
|     level_idc[ i ] | 0 | u(8) |
|     num_applicable_ops_minus1[ i ] | 0 | ue(v) |
|     for( j = 0; j <= num_applicable_ops_minus1[ i ]; j++ ) { | | |
|       applicable_op_temporal_id[ i ][ j ] | 0 | u(3) |
|       applicable_op_num_target_views_minus1[ i ][ j ] | 0 | ue(v) |
|       for( k = 0; k <= applicable_op_num_target_views_minus1[ i ][ j ]; k++ ) | | |
|         applicable_op_target_view_id[ i ][ j ][ k ] | 0 | ue(v) |
|       applicable_op_num_views_minus1[ i ][ j ] | 0 | ue(v) |
|     } | | |
|   } | | |
|   if ( profile_idc = = 134 ) { | | |
|     rpu_data_header( ) | | |
|     rpu_data_payload_om( ) | | |
|   } | | |
| } | | |

TABLE 3

RPU Data Header Syntax

| | C | Descriptor |
|---|---|---|
| rpu_data_header ( ) { | | |
|   rpu_type | 0 | u(6) |
|   rpu_format | 0 | u(6) |
|   if ( (rpu_format == 0 | | rpu_format == 1 )) { | | |
|     default_grid_position | 0 | u(1) |
|     if( !default_grid_position ) { | | |
|       view0_grid_position_x | 0 | u(4) |
|       view0_grid_position_y | 0 | u(4) |

TABLE 3-continued

RPU Data Header Syntax

|  | C | Descriptor |
|---|---|---|
|     view1_grid_position_x | 0 | u(4) |
|     view1_grid_position_y | 0 | u(4) |
|   } | | |
| } | | |
| if ( !frame_mbs_only_flag) | | |
|   interlace_processing_flag | 0 | u(1) |
| disable_part_symmetry_flag | 0 | u(1) |
| num_x_partitions_minus1 | 0 | ue(v) |
| num_y_partitions_minus1 | 0 | ue(v) |
| } | | |

TABLE 4

RPU Data Payload Syntax

|  | C | Descriptor |
|---|---|---|
| rpu_data_payload_om( ) { | | |
|   for (y = 0, y <= num_y_partitions_minus1; y++ ) { | | |
|     for (x = 0; x <= num_x_partitions_minus1; x++ ) | | |
|     { | | |

TABLE 4-continued

RPU Data Payload Syntax

|  | C | Descriptor |
|---|---|---|
|       separate_component_filtering_flag | 0 | u(1) |
|       if ( separate_component_filtering_flag ) | | |
|         num_cmps = 3 | | |
|       else | | |
|         num_cmps = 1 | | |
|       for ( cmp = 0; cmp < num_cmps; cmp++ ) { | | |
|         filter_idx_down [ y ][ x ] [ cmp ] | 0 | u(2) |
|         filter_idx_up [ y ][ x ] [ cmp ] | 0 | u(2) |
|       } | | |
|     } | | |
|   } | | |
| } | | |

TABLE 5

RPU format

| rpu_type | rpu_format | rpu_format_name | RPU format |
|---|---|---|---|
| 0 | 0 | SbS | OM-FCFR Side by Side |
| 0 | 1 | OU | OM-FCFR Top and Bottom |
| 1-63 | 1-63 | 2-63 | Reserved |

TABLE 6

Down-sampling and Up-sampling filter_idx

| | filter_name | |
|---|---|---|
| filter_idx | OM-FCFR RPU Down-sampling | OM-FCFR RPU Up-sampling |
| 0 | OM_RPU_DOWN_F0 | OM_RPU_UP_F0 |
| 1 | OM_RPU_DOWN_F1 | OM_RPU_UP _F1 |
| 2 | OM_RPU_DOWN_F2 | OM_RPU_UP _F2 |
| 3 | reserved | Reserved |

TABLE 7

RPU implicit filter definition

| filter_name | filter_1D_tap | filter_dynamic_range | filter_offset | fiter_1D_tap_length |
|---|---|---|---|---|
| OM_RPU_DOWN_F0 | [4 7 10 7 4] | 6 | 32 | 5 |
| OM_RPU_DOWN_F1 | [2 8 17 24 26 24 17 8 2] | 8 | 128 | 9 |
| OM_RPU_UP_F0 | [3 −17 78 78 −17 3] | 7 | 64 | 6 |
| OM_RPU_UP _F1 | [−11 75 75 −11] | 7 | 64 | 4 |

TABLE 8

OM_FCFR Reconstruction filters

| filter_name | filter_1D_tap | filter_dynamic_range | filter_offset | filter_1D_tap_length |
|---|---|---|---|---|
| OM_RECON_UP | [3 −17 78 78 −17 3] | 7 | 64 | 6 |
| OM_RECON_HPF | [−2 −2 2 7 5 −13 −37 79 −37 −13 5 7 2 −2 −2] | 7 | 64 | 15 |

9. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
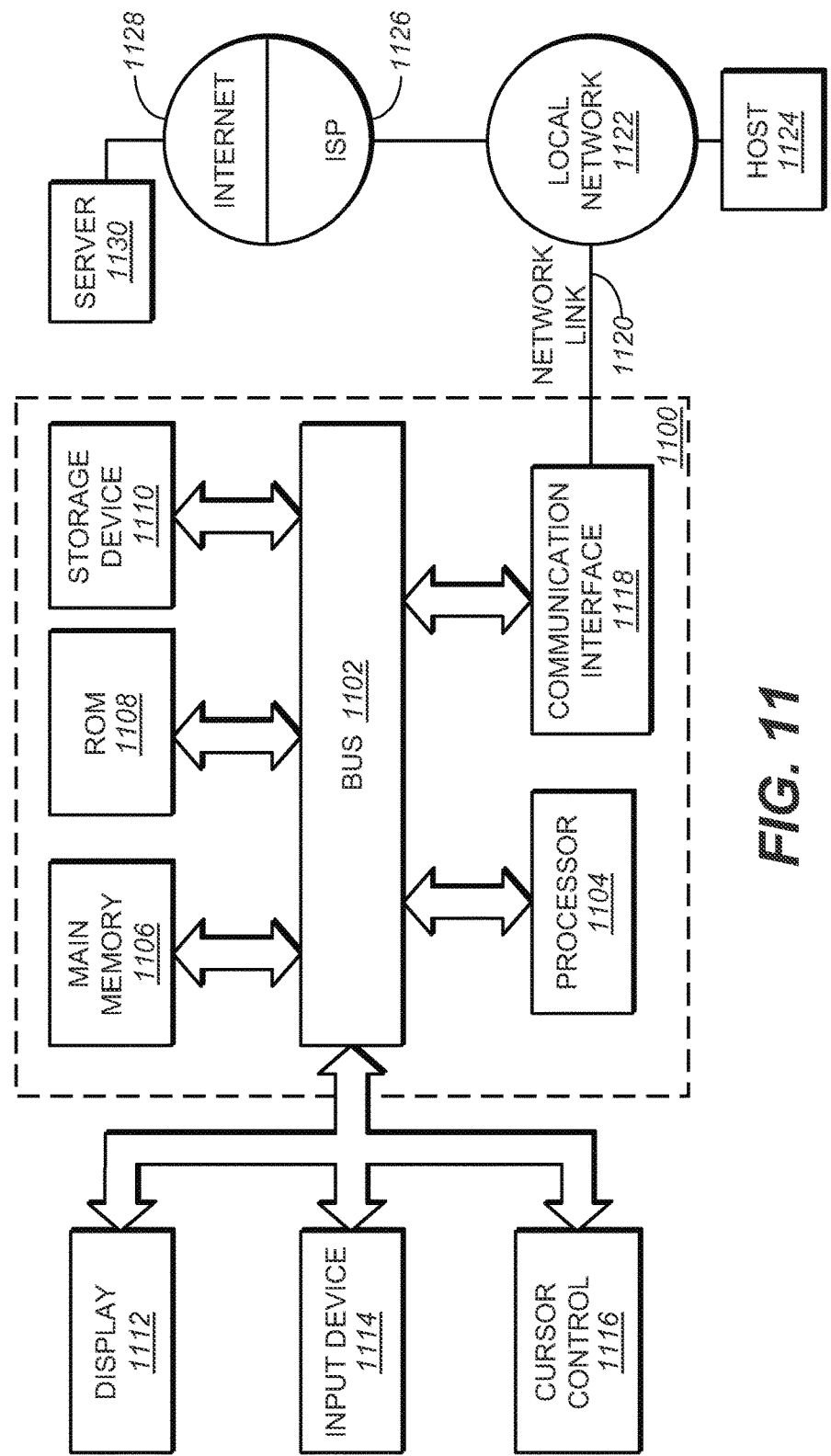
FIG. 11 illustrates an example hardware platform on which a computer or a computing device as described herein may be implemented, according an example embodiment of the present invention.

For example, FIG. 11 is a block diagram that illustrates a computer system 1100 upon which an example embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a liquid crystal display, for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

10. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method using a processor, the method comprising:
    receiving an input 3D image, the input 3D image comprising a left eye (LE) input image frame and a right eye (RE) input image frame;
    generating, based on the LE input image frame and the RE input image frame, a first multiplexed image frame comprising first spatial frequency content unfiltered in a vertical direction including first high spatial frequency content in the vertical direction and first reduced resolution content in a horizontal direction;
    wherein the first spatial frequency content unfiltered in the vertical direction comprises spatial frequency content of the LE input image frame and the RE input image frame, unfiltered in the vertical direction;
    wherein the first high spatial frequency content in the vertical direction comprises high spatial frequency content of the LE input image frame and the RE input image frame, in the vertical direction;
    wherein the first reduced resolution content in the horizontal direction comprises reduced resolution content of the LE input image frame and the RE input image frame, in the horizontal direction;
    generating, based on the LE input image frame and the RE input image frame, a second multiplexed image frame comprising second spatial frequency content unfiltered in the horizontal direction including second high spatial frequency content in the horizontal direction and second reduced resolution content in the vertical direction;
    wherein one of the first multiplexed image frame or the second multiplexed image frame comprises residual image data in combination with carrier image data, wherein the residual image data is generated by subtracting reference image data generated based on the other of the first multiplexed image frame or the second multiplexed image frame from input image data derived from the LE input image frame and the RE input image frame; wherein all the carrier image data comprise pixel values of the same fixed value;
    wherein the second spatial frequency content unfiltered in the horizontal direction comprises spatial frequency content of the LE input image frame and the RE input image frame, unfiltered in the horizontal direction;
    wherein the second high spatial frequency content in the horizontal direction comprises high spatial frequency content of the LE input image frame and the RE input image frame, in the horizontal direction;
    wherein the second reduced resolution content in the vertical direction comprises reduced resolution content of the LE input image frame and the RE input image frame, in the vertical direction; and
    encoding and outputting the first multiplexed image frame and the second multiplexed image frame to represent the input 3D image.

2. The method as recited in claim 1, wherein the 3D input image is a first 3D input image in a sequence of 3D input images comprising a second different 3D input image having a second LE input image frame and a second RE input image frame; and the method further comprising:
    generating, based on the second LE input image frame and the second RE input image frame, a third multiplexed image frame comprising third high spatial frequency content in the vertical direction and third reduced resolution content in the horizontal direction;
    generating, based on the second LE input image frame and the second RE input image frame, a fourth multiplexed image frame comprising fourth high spatial frequency content in the horizontal direction and fourth reduced resolution content in the vertical direction; and
    encoding and outputting the third multiplexed image frame and the fourth multiplexed image frame to represent the second input 3D image.

3. The method as recited in claim 1, wherein the first multiplexed image frame comprises a first LE image data portion and a first RE image data portion; wherein the first LE image data portion and the first RE image data portion are of a same spatial resolution along both horizontal and vertical directions; wherein the second multiplexed image frame comprises a second LE image data portion and a second RE image data portion; and wherein the second LE image data portion and the second RE image data portion are of a same spatial resolution along both horizontal and vertical directions.

4. The method as recited in claim 3, wherein each of the first LE image data portion and the first RE image data portion represents a subsampled version of a full resolution image frame; wherein the first multiplexed image frame adopts a side-by-side (SbS) format to carry the first LE image data portion and the first RE image data portion; wherein each of the second LE image data portion and the second RE image data portion represents a subsampled version of a full resolution image frame; and wherein the second multiplexed image frame adopts a top-and-bottom (TaB) format to carry the second LE image data portion and the second RE image data portion.

5. The method as recited in claim 1, wherein the first multiplexed image frame adopts a first multiplexing format that preserves the high spatial frequency content in the vertical direction, and wherein the second multiplexed image frame adopts a second multiplexing format that preserves the high spatial frequency content in the horizontal direction.

6. The method as recited in claim 1, wherein one of the first multiplexed image frame or the second multiplexed image frame is outputted in a base layer bitstream in a plurality of bit streams, while the other of the first multiplexed image frame or the second multiplexed image frame is outputted in an enhancement layer bitstream in the plurality of bit streams.

7. The method as recited in claim 1, further comprising:
generating, based at least in part on the first multiplexed image frame, prediction reference image data; and
encoding an enhancement layer video signal based on differences between the prediction reference image data and the input 3D image.

8. The method as recited in claim 1, further comprising:
applying one or more first operations comprising at least one of (a) spatial frequency filtering operations or (b) spatial subsampling operations in the second direction to the first input image frame and the second input image frame in generating the first multiplexed image frame, wherein the one or more first operations removes high spatial frequency content in the second direction and preserves high spatial frequency content in the first direction; and
applying one or more second operations comprising at least one of (a) spatial frequency filtering operations or (b) spatial subsampling operations in the first direction to the first input image frame and the second input image frame in generating the second multiplexed image frame, wherein the one or more second operations removes high spatial frequency content in the first direction and preserves high spatial frequency content in the second direction.

9. The method as recited in claim 1, further comprising converting one or more 3D input images represented, received, transmitted, or stored with one or more input video signals into one or more 3D output images represented, received, transmitted, or stored with one or more output video signals.

10. The method as recited in claim 1, wherein the input 3D image comprises image data encoded in one of a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

11. A method using a processor, the method comprising:
receiving a 3D image represented by a first multiplexed image frame and a second multiplexed image frame, the first multiplexed image frame comprising first spatial frequency content unfiltered in a vertical direction including first high spatial frequency content in the vertical direction and first reduced resolution content in a horizontal direction, and the second multiplexed image frame comprising second spatial frequency content unfiltered in the horizontal direction including second high spatial frequency content in the horizontal direction and second reduced resolution content in the vertical direction; wherein one of the first multiplexed image frame or the second multiplexed image frame comprises residual image data, wherein the residual image data has been generated by subtracting reference image data generated based on the other of the first multiplexed image frame or the second multiplexed image frame from input image data derived from a LE input image frame and a RE input image frame;
wherein the first spatial frequency content unfiltered in the vertical direction comprises spatial frequency content of the LE input image frame and the RE input image frame, unfiltered in the vertical direction;
wherein the first high spatial frequency content in the vertical direction comprises high spatial frequency content of the LE input image frame and the RE input image frame, in the vertical direction;
wherein the first reduced resolution content in the horizontal direction comprises reduced resolution content of the LE input image frame and the RE input image frame, in the horizontal direction;
wherein the second spatial frequency content unfiltered in the horizontal direction comprises spatial frequency content of the LE input image frame and the RE input image frame, unfiltered in the horizontal direction;
wherein the second high spatial frequency content in the horizontal direction comprises high spatial frequency content of the LE input image frame and the RE input image frame, in the horizontal direction;
wherein the second reduced resolution content in the vertical direction comprises reduced resolution content of the LE input image frame and the RE input image frame, in the vertical direction;
wherein one of the first multiplexed image frame and the second multiplexed image frame comprises a residual image frame and a carrier image frame;
wherein all the carrier image frame comprises pixel values of the same fixed value;
generating, based on the first multiplexed image frame and the second multiplexed image frame, a left eye (LE) image frame and a right eye (RE) image frame, the LE image frame comprising LE high spatial frequency content in both horizontal and vertical directions, and the RE image frame comprising RE high spatial frequency content in both horizontal and vertical directions; and
rendering the 3D image by rendering the LE image frame and the RE image frame.

12. The method as recited in claim 11, wherein the 3D image is a first 3D image in a sequence of 3D images comprising a second different 3D image having third multiplexed image frame and a fourth multiplexed image frame, the third multiplexed image frame comprising third high spatial frequency content in the vertical direction and third reduced resolution content in the horizontal direction, and the fourth multiplexed image frame comprising fourth high spatial frequency content in the horizontal direction and fourth reduced resolution content in the vertical direction; and the method further comprising:
generating a second LE image frame and a second RE image frame, the second LE image frame comprising high spatial frequency content in both horizontal and vertical directions, and the second LE image frame comprising high spatial frequency content in both horizontal and vertical directions; and rendering the second 3D image by rendering the second LE image frame and the second RE image frame.

13. The method as recited in claim 11, wherein at least one of the first multiplexed image frame or the second multiplexed image frame comprises an LE image data portion and an RE image data portion; and wherein the LE image data portion and the RE image data portion are of a same spatial resolution.

14. The method as recited in claim 13, wherein each of the LE image data portion and the RE image data portion represents a subsampled version of a full resolution image frame; and wherein the LE image data portion and the RE image data portion forms a single image frame in one of a side-by-side format or a top-and-bottom format.

15. The method as recited in claim 11, wherein one of the first multiplexed image frame or the second multiplexed image frame is decoded from a base layer bitstream in a plurality of bit streams, while the other of the first multiplexed image frame or the second multiplexed image frame is decoded from an enhancement layer bitstream in the plurality of bit streams.

16. The method as recited in claim 11, further comprising:
generating, based at least in part on one of the first multiplexed image frame or the second multiplexed image frame, prediction reference image data; and
generating, based on enhancement layer (EL) data decoded from an EL video signal and the prediction reference image data, one of the LE image frame or the RE image frame.

17. The method as recited in claim 11, further comprising:
applying one or more first operations comprising at least one of (a) spatial frequency filtering operations or (b) demultiplexing operations in generating the LE image frame, wherein the one or more first operations combine LE high spatial frequency content, as derived from the first multiplexed image frame and the second multiplexed image frame, of both horizontal and vertical directions into the LE image frame; and
applying one or more second operations comprising at least one of (a) spatial frequency filtering operations or (b) demultiplexing operations in generating the RE image frame, wherein the one or more second operations combine RE high spatial frequency content, as derived from the first multiplexed image frame and the second multiplexed image frame, of both horizontal and vertical directions into the RE image frame.

18. The method as recited in claim 17, wherein the one or more first operations and the one or more second operations comprise at least a high pass filtering operation.

19. The method as recited in claim 17, wherein the one or more first operations and the one or more second operations comprise a processing sub-path that replaces at least one high pass filtering operation; and wherein the processing sub-path comprises at least one subtraction operation and no high pass filtering operation.

20. The method as recited in claim 11, the method further comprising:
decoding and processing enhancement layer image data without generating prediction reference data from the other of the first multiplexed image frame or the second multiplexed image frame.

21. The method as recited in claim 11, further comprising processing one or more 3D images represented, received, transmitted, or stored with one or more input video signals.

22. The method as recited in claim 11, wherein the 3D image comprises image data encoded in one of a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

23. A system, comprising:
an encoder configured to
receive an input 3D image, the input 3D image comprising a left eye (LE) input image frame and a right eye (RE) input image frame;
generate, based on the LE input image frame and the RE input image frame, a first multiplexed image frame comprising first spatial frequency content unfiltered in a vertical direction including first high spatial frequency content in the vertical direction and first reduced resolution content in a horizontal direction;
wherein the first spatial frequency content unfiltered in the vertical direction comprises spatial frequency content of the LE input image frame and the RE input image frame, unfiltered in the vertical direction;
wherein the first high spatial frequency content in the vertical direction comprises high spatial frequency content of the LE input image frame and the RE input image frame, in the vertical direction;
wherein the first reduced resolution content in the horizontal direction comprises reduced resolution content of the LE input image frame and the RE input image frame, in the horizontal direction;
generate, based on the LE input image frame and the RE input image frame, a second multiplexed image frame comprising second spatial frequency content unfiltered in the horizontal direction including second high spatial frequency content in the horizontal direction and second reduced resolution content in the vertical direction;
wherein one of the first multiplexed image frame or the second multiplexed image frame comprises residual image data in combination with carrier image data, wherein the residual image data is generated by subtracting reference image data generated based on the other of the first multiplexed image frame or the second multiplexed image frame from input image data derived from the LE input image frame and the RE input image frame;
wherein all the carrier image data comprises pixel values of the same fixed value;
wherein the second spatial frequency content unfiltered in the horizontal direction comprises spatial frequency content of the LE input image frame and the RE input image frame, unfiltered in the horizontal direction;
wherein the second high spatial frequency content in the horizontal direction comprises high spatial frequency content of the LE input image frame and the RE input image frame, in the horizontal direction;
wherein the second reduced resolution content in the vertical direction comprises reduced resolution content of the LE input image frame and the RE input image frame, in the vertical direction; and
encode and outputting the first multiplexed image frame and the second multiplexed image frame to represent the input 3D image;

a decoder configured to:
receive the first multiplexed image frame and the second multiplexed image frame in a plurality of video bitstreams;
wherein one of the first multiplexed image frame and the second multiplexed image frame comprises the residual image data in combination with carrier image data;
wherein all the carrier image data comprises pixel values of the same fixed value;
generate, based on the first multiplexed image frame and the second multiplexed image frame, a left eye (LE) image frame and a right eye (RE) image frame, the LE image frame comprising LE high spatial frequency content in both horizontal and vertical directions, and the RE image frame comprising RE high spatial frequency content in both horizontal and vertical directions; and
render the LE image frame and the RE image frame.

24. A method for encoding 3D frame compatible full resolution (FCFR) images using a processor, the method comprising:
receiving an input 3D image, the input 3D image comprising a left eye (LE) input image frame and a right eye (RE) input image frame;
generating, based on the LE input image frame and the RE input image frame, a first multiplexed image frame comprising first spatial frequency content unfiltered in a first direction including first high spatial frequency content in the first direction and first reduced resolution content in a second direction, the second direction being orthogonal to the first direction;
wherein the first spatial frequency content unfiltered in the vertical first spatial direction comprises spatial frequency content of the LE input image frame and the RE input image frame, unfiltered in the vertical first spatial direction;
wherein the first high spatial frequency content in the first spatial direction comprises high spatial frequency content of the LE input image frame and the RE input image frame, in the first spatial direction;
wherein the first reduced resolution content in the second spatial direction comprises reduced resolution content of the LE input image frame and the RE input image frame, in the second spatial direction;
generating, based on the first multiplexed image frame, reference image data and carrier image data;
subtracting the reference image data from the input 3D image data to generate residual image data;
generating, based on the residual image data and the carrier image data, a second multiplexed image frame comprising second spatial frequency content unfiltered in the second direction including second high spatial frequency content in the second direction and second reduced spatial frequency content in the first direction;
wherein the second spatial frequency content unfiltered in the second spatial direction comprises spatial frequency content of the LE input image frame and the RE input image frame, unfiltered in the second spatial direction;
wherein the second high spatial frequency content in the second spatial direction comprises high spatial frequency content of the LE input image frame and the RE input image frame, in the second spatial direction; and encoding and outputting the first multiplexed image frame and the second multiplexed image frame to represent the input 3D image, wherein generating the carrier image data comprises:
applying a first spatial filtering in a first direction of a base layer image frame to down-sample the base layer image frame and generate an intermediate image, the base layer image based at least in part on the first multiplexed image frame; and
applying a second spatial filtering in a second direction to the intermediate image to up-sample the intermediate image to generate the carrier image data, wherein the second direction is orthogonal to the first direction;
wherein all the carrier image data comprise pixel values of the same fixed value.

25. A method using a processor for decoding 3D signals coded in a frame compatible full resolution (FCFR) format, the method comprising:
receiving a 3D image represented by a first multiplexed image frame and second multiplexed image frame, the first multiplexed image frame comprising first spatial frequency content unfiltered in a first spatial direction including first high spatial frequency content in the first spatial direction and first reduced resolution content in a second spatial direction, and the second multiplexed image frame comprising second high spatial frequency content in the second spatial direction and second reduced resolution content in the first spatial direction, wherein the second spatial direction is orthogonal to the first spatial direction;
wherein the first spatial frequency content unfiltered in the first spatial direction comprises spatial frequency content of an LE input image frame and an RE input image frame, unfiltered in the first spatial direction;
wherein the first high spatial frequency content in the first spatial direction comprises high spatial frequency content of the LE input image frame and the RE input image frame, in the first spatial direction;
wherein the first reduced resolution content in the second spatial direction comprises reduced resolution content of the LE input image frame and the RE input image frame, in the second spatial direction;
wherein the second spatial frequency content unfiltered in the second spatial direction comprises spatial frequency content of the LE input image frame and the RE input image frame, unfiltered in the second spatial direction;
wherein the second high spatial frequency content in the second spatial direction comprises high spatial frequency content of the LE input image frame and the RE input image frame, in the second spatial direction;
wherein the second reduced resolution content in the first spatial direction comprises reduced resolution content of the LE input image frame and the RE input image frame, in the first spatial direction;
generating based on the first multiplexed image frame a frame-compatible pair of image frames (FC-L, FC-R) comprising the first spatial frequency content unfiltered in the second direction including the first high spatial frequency content in the first spatial direction and the first reduced spatial frequency content in the second spatial direction; and
generating based on the first multiplexed image frame and the second multiplexed image frame a full-resolution pair of frames (FR-LE, FR-RE) comprising high spatial frequency content in both the first spatial direction and the second spatial direction, wherein the second multiplexed image frame comprises a residual image frame combined with a carrier image frame and wherein the carrier image frame is generated based on the first multiplexed image frame and then subtracted from the second multiplexed image frame to generate the residual image frame;

wherein all the carrier image frame comprises pixel values of the same fixed value.

26. The method of claim 25, further comprising applying a high-pass filter in the second spatial direction of the second multiplexed image frame to generate the residual image frame.

* * * * *